(12) United States Patent
Hou et al.

(10) Patent No.: US 9,722,864 B2
(45) Date of Patent: Aug. 1, 2017

(54) SYSTEMS, METHODS, AND APPARATUS TO CONFIGURE EMBEDDED DEVICES

(71) Applicant: Intel Corporation, Santa Clara, CA (US)

(72) Inventors: Zhaorong Hou, Portland, OR (US); Bryan Hunt, Tigard, OR (US); Michael Beale, Hillsboro, OR (US); David O. Novick, Beaverton, OR (US); Carlos Carrizo, Córdoba (AR); Rameshkumar G. Illikkal, Portland, OR (US); Srinivas Sundaravaradan, Hillsboro, OR (US); Francisco M. Casares, Hillsboro, OR (US); Mark P. Baldwin, Hillsboro, OR (US); Krishna Surya, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 70 days.

(21) Appl. No.: 14/752,524

(22) Filed: Jun. 26, 2015

(65) Prior Publication Data

US 2016/0380809 A1 Dec. 29, 2016

(51) Int. Cl.
*H04L 12/24* (2006.01)
*H04L 29/08* (2006.01)
(Continued)

(52) U.S. Cl.
CPC ...... *H04L 41/0803* (2013.01); *H04L 63/0428* (2013.01); *H04L 67/12* (2013.01); *H04W 4/008* (2013.01)

(58) Field of Classification Search
CPC . H04L 41/0803; H04L 67/02; H04L 63/0428; H04W 4/008
See application file for complete search history.

(56) References Cited

U.S. PATENT DOCUMENTS 6,873,259 B2 * 3/2005 Teraura ............... G06K 19/0723
235/375
8,811,896 B2 * 8/2014 Katz .................. G06K 7/10237
455/41.1
(Continued)

FOREIGN PATENT DOCUMENTS

EP 2645476 10/2013
WO 2015026401 2/2015

OTHER PUBLICATIONS

International Searching Authority, "Written Opinion and Search Report," issued in connection with application No. PCT/US2016/032468, on Aug. 26, 2016, 13 pages.
(Continued)

*Primary Examiner* — Albert T Chou
(74) *Attorney, Agent, or Firm* — Hanley, Flight & Zimmerman, LLC

(57) ABSTRACT

Systems, methods, and apparatus to configure embedded devices are described. An example apparatus includes a network interface to communicatively couple the apparatus with a network, an antenna to receive a radio frequency signal including 1) configuration data and 2) power, a memory coupled to the antenna to receive the power and to store the configuration data, a network configurer to retrieve the configuration data from the memory and to configure the network interface based on the retrieved data, and a power source other than the antenna to provide power to the memory and the network configurer during operation of the network configurer.

18 Claims, 15 Drawing Sheets

(51) Int. Cl.
*H04W 4/00* (2009.01)
*H04L 29/06* (2006.01)

(56) References Cited

U.S. PATENT DOCUMENTS

| | | | |
|---|---|---|---|
| 2008/0041930 A1* | 2/2008 | Smith | G06F 9/44505 |
| | | | 235/375 |
| 2010/0291867 A1 | 11/2010 | Abdulla et al. | |
| 2012/0262281 A1* | 10/2012 | Edwards | G06F 9/44505 |
| | | | 340/10.42 |
| 2012/0303768 A1 | 11/2012 | Fiennes | |
| 2013/0127602 A1* | 5/2013 | Jantunen | H04W 52/0274 |
| | | | 340/10.51 |
| 2014/0025795 A1 | 1/2014 | Fiennes | |

OTHER PUBLICATIONS

Zack Whittaker, "Wi-Fi Protected Setup now supports NFC got tap-to-connect access to wok, home networks", ZD Net article, retreived date Mar. 6, 2015, http://www.zdnet.com/article/wi-fi-protected-setup-now-supports-nfc-for . . . , Apr. 9, 2014, 3 pages.

\* cited by examiner

SYSTEMS, METHODS, AND APPARATUS TO CONFIGURE EMBEDDED DEVICES

FIELD OF THE DISCLOSURE

This disclosure relates generally to embedded devices, and, more particularly, to systems, methods, and apparatus to configure embedded devices.

BACKGROUND

Embedded devices with sensors and/or electronics embedded within them can be networked together into what is sometimes called, "the Internet of Things." The Internet of Things includes networked monitoring devices (e.g., cameras, air qualities monitors, remote health monitoring, etc.), home automation devices (e.g., air conditioning, energy management, appliances, etc.), transportation devices (e.g., automated vehicles, vehicle monitors, fleet management, etc.), etc. Often such embedded devices include limited or no user interfaces. Accordingly, configuration of such embedded devices is often performed with another, more powerful computing device communicatively coupled with the embedded device. For example, some embedded devices are configured by attaching the embedded device to a computer using a universal serial bus connection and downloading a configuration file from the computer to the embedded device.

BRIEF DESCRIPTION OF THE DRAWINGS

The figures are not to scale. Wherever appropriate, the same or similar reference numbers will be used throughout the drawing(s) and accompanying written description to refer to the same or like parts.

DETAILED DESCRIPTION

Figure 1:
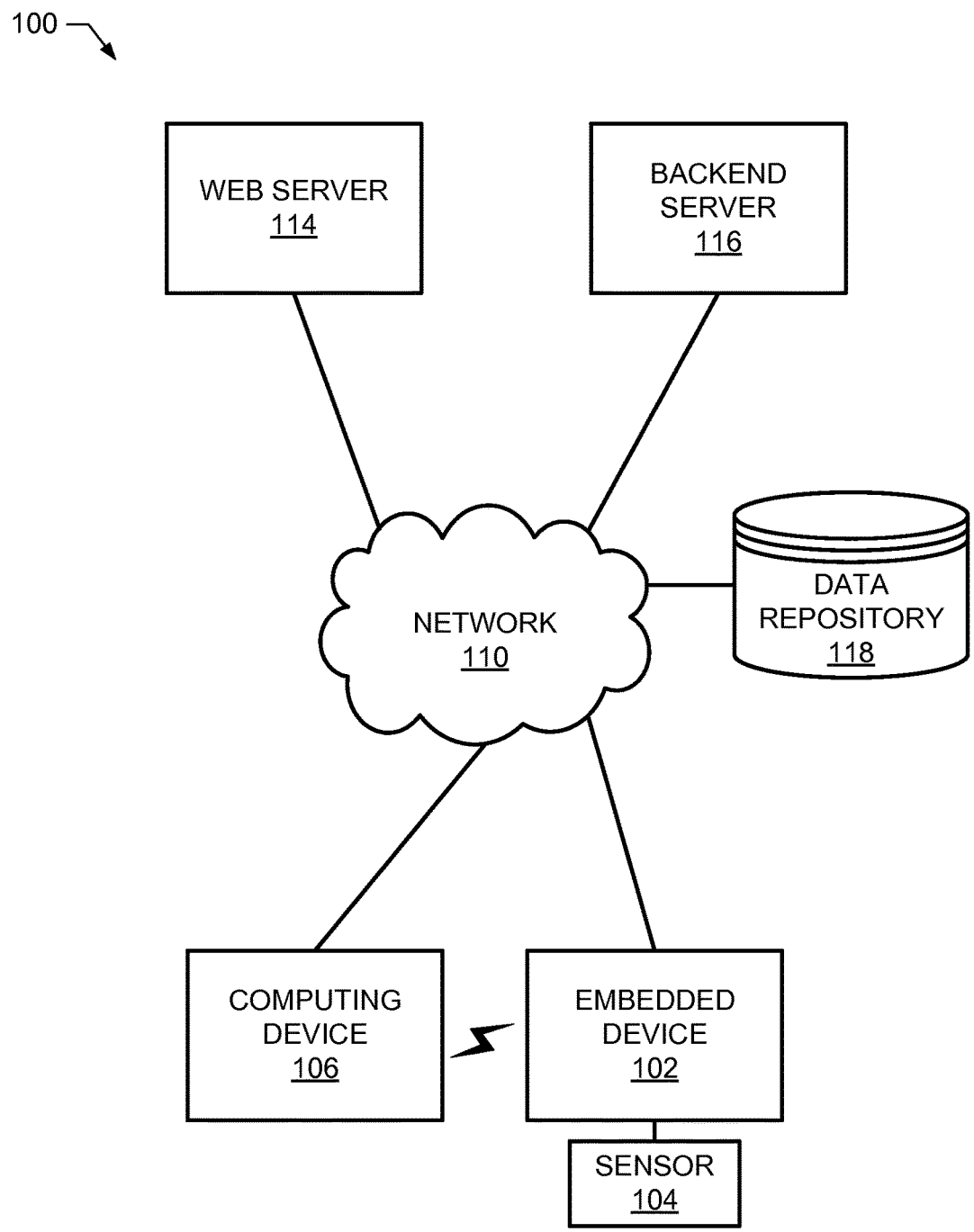
FIG. 1 is a block diagram of an example system constructed in accordance with the teachings of this disclosure to configure an embedded device.

The initial configuration and setup for embedded devices such as Internet of Things devices typically requires a significant amount of user intervention and time to complete. For example, Wi-Fi network configuration may require a technician to connect the embedded device to a wired network, boot up, and configure the embedded device via remote desktop. The technician may also need to manually input the device identifier to complete registration of the embedded device. This poor user experience leads to low adoption rate and market segment share because of the increased labor costs for setup of the embedded devices.

Example systems, methods, and apparatus disclosed utilize short range wireless communication protocols such as near field communication (NFC) to facilitate efficient configuration of an embedded device. The example systems, methods, and apparatus may be utilized to configure multiple embedded devices. For example, a crate of embedded devices may be configured without even removing the embedded devices from the crate and/or the individual packaging of each embedded device.

To facilitate configuration of an embedded device, an antenna (e.g., an NFC antenna) is added to the embedded device to receive a radio frequency signal that includes sufficient power to power a memory. The radio frequency signal additionally includes configuration data for the embedded device. Accordingly, the configuration data can be transferred to the example embedded device and stored in the memory of the embedded device without powering on the embedded device (e.g., powering on the embedded device using a battery or a power adapter). Later, when the embedded device is powered on (e.g., using battery power or power from a power adapter), a network configurer of the embedded device reads the configuration data from the memory and configures a network interface of the embedded device to allow the embedded device to communicate with a networked service such as a backend service.

As used herein, the term "embedded device" includes any type of physical object that includes embedded electronics. The embedded device may include a processor, microprocessor, logic circuit, or other circuitry for performing computerized operations. Some embedded devices as disclosed herein includes communication circuitry for communicating with other computing devices (e.g., as a part of the Internet of Things) while other embedded devices do not include communication circuitry (other than the short range wireless communication circuitry used for configuration as disclosed herein).

As used herein, the phrase "power on an embedded device" and its other forms refers to providing power to and/or providing an instruction to begin operations to an embedded device. As used herein, "power on an embedded device" does not include providing power to some or all components of the embedded device via a short range wireless communication antenna (e.g., an NFC antenna) to provide configuration data to the embedded device.

FIG. 1 is a block diagram of an example system 100 to configure an embedded device 102. The example system 100 of FIG. 1 includes the embedded device 102, a sensor 104, a computing device 106, a network 110, a web server 114, a backend server 116, and a data repository 118.

The example embedded device 102 of FIG. 1 is an Internet of Things device that is coupled with the sensor 104 to collect data from the sensor 104 and to transmit the data to the example data repository 118. For example, the embedded device 102 may be a remote temperature sensing device that is a part of a network of temperature sensors distributed across a geographic region and the sensor 104 may be a temperature probe. The embedded device may alternatively be any other type of physical object that included embedded electronics. For example, the embedded device 102 may be a computing device, may be a device that typically does not include processing capabilities but to which a processor has been added to connect the device to a network (e.g., a refrigerator to which processing and networking capabilities have been added), etc. The example embedded device 102 does not include a display screen. Alternatively, the embedded device 102 may include a display screen, a limited user interface, etc. An example implementation of the embedded device 102 is described in conjunction with FIG. 2.

The example sensor 104 may be any type of sensor, probe, or other source of data for the embedded device 102. For example, the sensor 104 may be a temperature probe, a camera, a network data source, etc. While the example embedded device 102 is coupled with the sensor 104, the system 100 may alternatively not include the sensor 104.

The example computing device 106 is utilized by a user in the system 100 to communicate with the example embedded device 102 to configure (e.g., initialize) the embedded device 102. The computing device 106 of the illustrated example of FIG. 1 is a mobile computing device such as a cellular telephone. Alternatively, the computing device 106 may be any type of computing device that is capable of communicating with the embedded device 102 to configure the embedded device 102.

According to the illustrated example, the example computing device 106 includes a short range wireless communication capability (e.g., NFC) that communicates with a short range wireless communication capability of the embedded device 102. The example short range wireless communication capability may be used to power components (e.g., a subset of the components, all of the components, etc.) of the example embedded device 102 and to transfer configuration data to the example embedded device 102 during configuration of the example embedded device 102.

Figure 3:
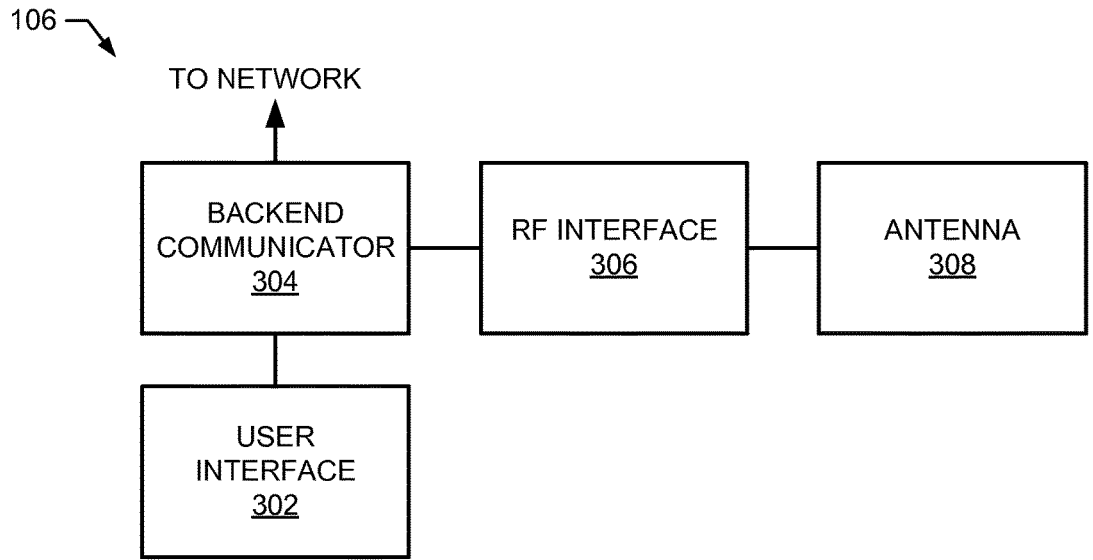
FIG. 3 is a block diagram of an example implementation of the computing device of FIG. 1.

An example implementation of the computer device 106 is described in conjunction with FIG. 3.

The network 110 of the illustrated example communicatively couples the example embedded device 102, the example computing device 106, the example web server 114, the example backend server 116, and the example data repository 118. The example network 110 is the internet. The network 110 may alternatively be any other type and number of networks. For example, the network 110 may be implemented by several local area networks connected to a wide area network. For example, the example embedded device 102 and the example computing device 106 may be associated with a first local area network and the example web server 114 and the example backend server 116 may be associated with a second local area network. In such an example, the first local area network and the second local area network may be independently connected to the example network 110 to communicatively couple the devices of the respective local area network to the example network 110. Alternatively, any other configuration and topology may be utilized to implement the network 110. For example, the network 110 may comprise any combination of wired networks, wireless networks, wide area networks, local area networks, etc.

The example web server 114 of FIG. 1 is a server that provides a web service to facilitate management of the services of the example backend server 116 by a user of the system (e.g., an administrator user). The example web server 114 includes an interface through which a user can authenticate (e.g., by providing a username and password); an interface for creating, modifying, and deleting user accounts for the example backend server 116; and an interface for creating, modifying, and deleting network configuration information that is stored by the example backend server 116. The example user accounts are used for authenticating a system user (e.g., a deployment technician) that is, for example, utilizing the example computing device 106 to configure the example embedded device 102. The example network configuration information includes network profiles that may be loaded onto the example embedded device 102 to enable the example embedded device 102 to connect to a network (e.g., a wireless local area network that is communicatively coupled to the example network 110). For example, the network configuration information may include, for example, identification information for wireless networks, authentication information for networks, internet protocol (IP) information for a network (e.g., IP address information, domain name service addresses, gateway IP addresses, etc.), proxy server information, etc.

While the example web server 114 interfaces with users via webpages served by the example web server 114 to facilitate the management of the backend server 116, the web server 114 may, alternatively, be replaced with another device (e.g., another computing device) that provide any type of interface (e.g., a command line interface, a graphical user interface, etc.). In some systems, the backend server 116 may include an integrated web server and the separate web server 114 may not be included. Additionally, while the example web server 114 of FIG. 1 provides interfaces for configuring user accounts and for managing network configurations, the web server 114 may additionally or alternatively provide interfaces for managing other aspects of the backend server 116 (e.g., configuring settings of the backend server 116, configuring device settings to be loaded onto the example embedded device 102, etc.).

Figure 4:
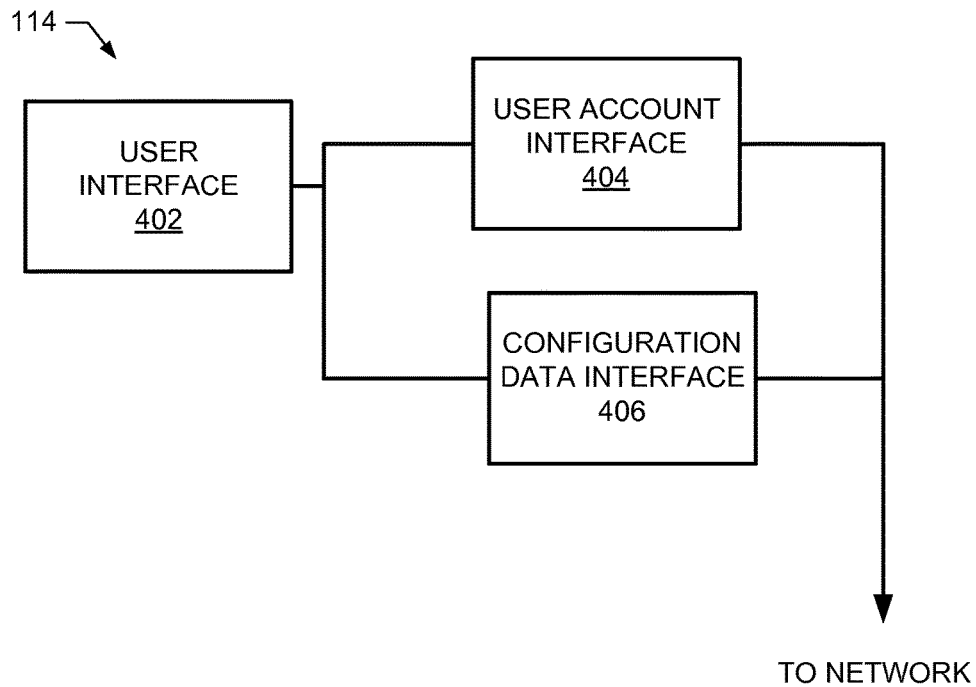
FIG. 4 is a block diagram of an example implementation of the web server of FIG. 1.

An example implementation of the web server 114 is described in conjunction with FIG. 4.

The backend server 116 of the illustrated example is a server that communicates with the example computing device 106 to authenticate users of the example computing device 106, collect information about the embedded device 102 via the example computing device 106 during deployment of the example embedded device 102, and to transmit configuration data to the example computing device 106 for transmission to the embedded device 102. According to the illustrated example, the backend server 116 is provided by a manufacturer of the example embedded device 102 to facilitate the deployment of the example embedded device 102 by end users of the embedded device 102. Alternatively, the backend server 116 and/or portions thereof may be provided by another entity (e.g., a business that purchases the embedded device 102 may maintain their own backend server to facilitate deployment of multiple embedded devices by the business). Additionally or alternatively, the backend server 116 may be integrated with other components of the system 100 (e.g., the web server 114 and/or the data repository 118). For example, the backend server 116 may facilitate deployment of the embedded device 102 by transmitting configuration data to the embedded device 102 and may receive data collected by the embedded device 102 for storage in a repository).

Figure 5:
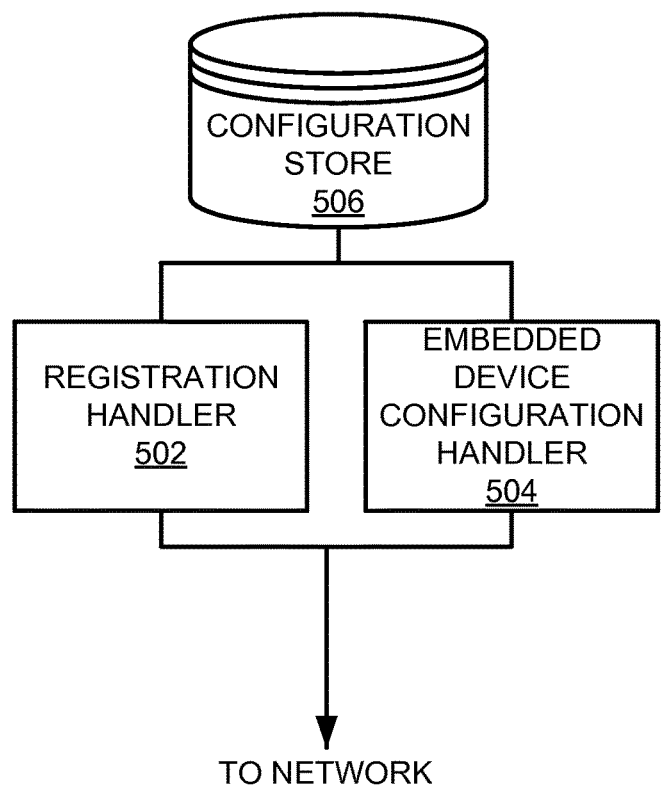
FIG. 5 is a block diagram of an example implementation of the backend server of FIG. 1.

An example implementation of the backend server 116 is described in conjunction with FIG. 5.

The example data repository 118 of FIG. 1 is a datastore that receives data collected by the example embedded device 102. The example data repository 118 may be any type of datastore including a server, a database, a file, etc. While the example system 100 includes the example data repository 118, some implementations of the system 100 may not include the data repository 118. For example, the functionality of the data repository 118 may be integrated in the example backend server 116, the embedded device 102 may store collected data locally (e.g., for later retrieval), the embedded device 102 may not be a device that collects data (e.g., the embedded device 102 could be a robotic device that performs a task without collecting data), etc. In some examples, the data repository 118 may provide reports of the collected data, may transmit the collected data to another device or system, may process the collected data, etc.

In operation, a user of the example system 100 (e.g., a user at an end-user location) operates the example computing device 106 to deploy the example embedded device 102 (e.g., a newly received embedded device that has not previously been deployed, an embedded device for which the configuration is to be changed (e.g., to communicate with a network not previously associated with the embedded device), etc.). The user inputs credentials into the example computing device 106, which verifies the credentials with the example backend server 116 (e.g., verifies that the credentials match credentials previously added to the backend server 116 via the example web server 114). The example computing device 106 transmits a signal to the example embedded device 102 to provide power to at least some components of the embedded device 102 and to retrieve a device identifier from the embedded device 102. For example, the computing device 106 may energize an NFC circuitry of the embedded device 102 and retrieve the device identifier. Using the device identifier, the computing device 106 retrieves configuration data for the embedded device 102 from the example backend server 116. The example computing device 106 again transmits a signal to the example embedded device 102 to power at least some components of the embedded device 102 and to store the configuration data in a memory of the embedded device 102. At a later time, when the embedded device 102 is powered on (e.g., is powered on for the first time after the configuration data has been stored), the embedded device 102 loads the newly stored configuration data and processes the configuration data to perform one or more of connecting the embedded device to a network (e.g., the network 110), communicating with the example backend server 116 or another server (e.g., a configuration server associated with the user), perform configuration of components of the embedded device 102 other than network communication, etc. Thus, configuration data can be loaded onto the embedded device 102 even if the embedded device 102 is not powered on (e.g., power is not provided by a battery or other power source, an on/off switch is not activated or is in the off position, etc.). Additionally, when a wireless signal is used by the computing device 106 in communicating with the embedded device 102, the embedded device 102 (and optionally multiple ones of the embedded device 102) may be programmed without the need for physical contact between the computing device 106 (or cables attached to the computing device 106) and the embedded device 102. For example, the embedded device 102 could be configured by the computing device 106 while the embedded device 102 remains in its packaging, is packed in a box of embedded devices, is on a pallet of embedded devices, etc.

Figure 2:
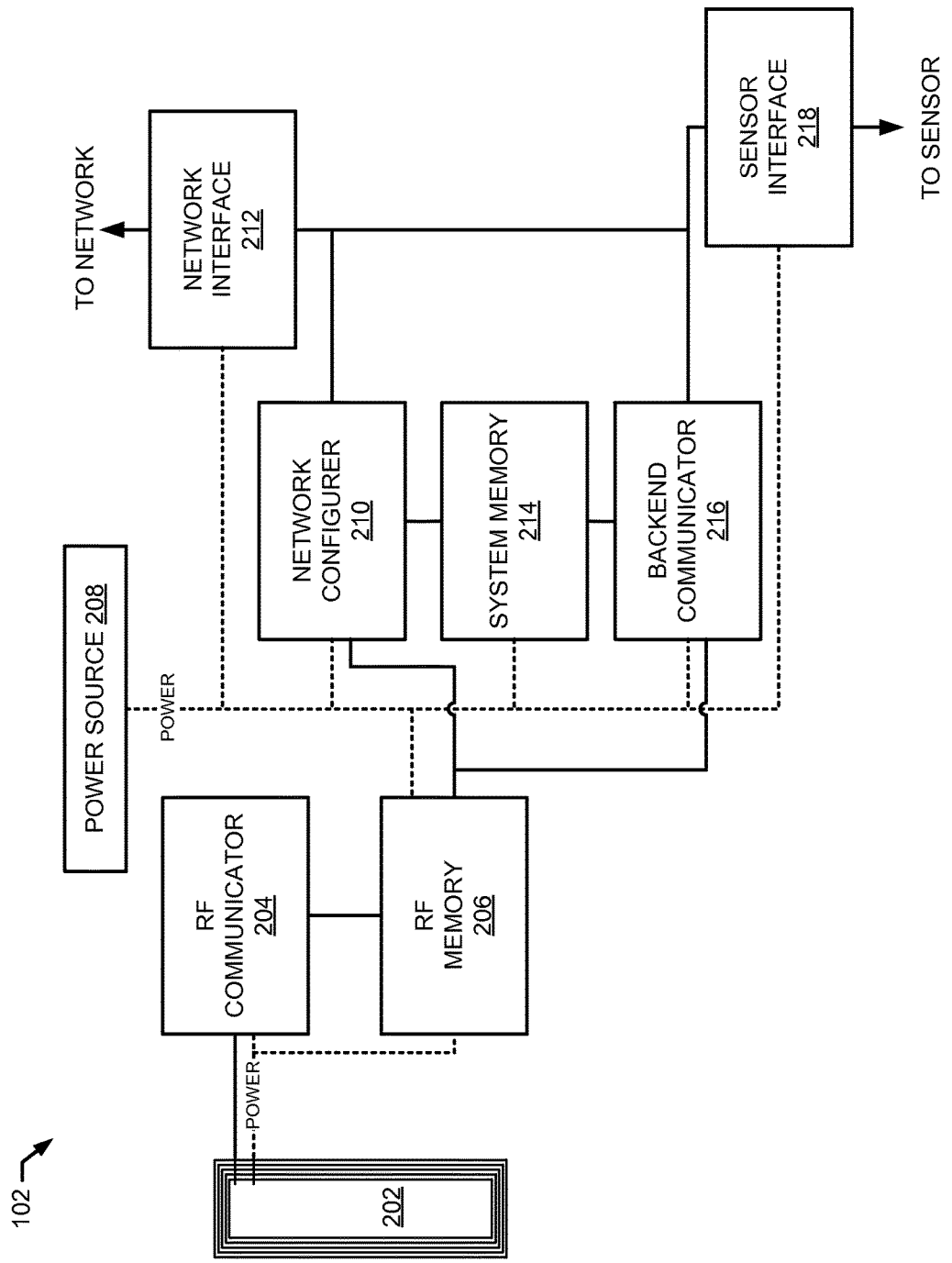
FIG. 2 is a block diagram of an example implementation of the embedded device of FIG. 1.

FIG. 2 is a block diagram of an example implementation of the embedded device 102 of FIG. 1. The example embedded device 102 of FIG. 2 includes an example antenna 202, an example radio frequency (RF) communication 204, an example RF memory 206, an example power source 208, an example network configurer 210, an example network interface 212, an example system memory 214, an example backend communicator 216, and an example sensor interface 218.

The example antenna 202 comprises two loop antennas from which electromagnetic energy is captured by induction. Energy captured by the example antenna 202 is transformed into operating power for the example RF communicator 204 and the example RF memory 206. In the illustrated example, the antenna 202 captures enough energy to power the RF communicator 204 and the RF memory 206 without the need for another power source. The electromagnetic energy captured by the example antenna 202 may additionally include data that the example RF communicator 204 stores in the example RF memory 206. According to the illustrated example, the computing device 106 emits an electromagnetic signal that energizes the example antenna 202 and thereby the example RF communicator 204 and the example RF memory 206. Additionally, the example electromagnetic signal carries requests from the example computing device 106 and carries configuration data from the example computing device 106 to the example embedded device 102. Alternatively, the antenna 202 may be any type of antenna and/or array of antennas. Further, the antenna 202 may be replaced by another type of interface when a wireless communication between the computing device 106 and the embedded device 102 is not utilized. For example, the antenna 202 may be replaced by a port that receives a wired connection such as a Universal Serial Bus (USB) connection.

The RF communicator 204 of the illustrated example receives power from the antenna 202, services requests for device identification information received via the antenna 202, and stores configuration data received via the example antenna 202 in the example RF memory 206. According to the illustrated example, in response to a request for device identification information (e.g., a request for device identification information received from the example computing device 106 via the example antenna 202), the example RF communicator 204 retrieves a device identifier stored in the example RF memory 206.

The example RF memory 206 of FIG. 2 stores device identification information (e.g., a device identifier) for retrieval by the example RF communicator 204 and stores configuration data received from the example antenna 202 via the example RF communicator 204. The example RF memory 206 is electrically erasable programmable read only memory (EEPROM). Alternatively, the RF memory 206 may be any other type of memory or storage such as flash memory, disk storage, etc.

The example power source 208 provides power to components of the example embedded device 102 of FIG. 2. According to the illustrated example, the power source 208 provides power to the example network configured to 210, the example network interface 212, the example system memory 214, the example backend communicator to 216, and the example sensor interface to 218. Additionally, the example power source 208 provides power to the example RF memory 206 when the RF memory 206 is not powered the example antenna 202. The example power source 208 is a battery. Alternatively, the power source 208 may be any other source of power such as an electrical power transformer, an inductive power source, etc.

The network configurer 210 of the illustrated example retrieves configuration data from the example RF memory 206 when the embedded device 102 is powered on (e.g., the first time that the example embedded device 102 is powered on) and configures the example network interface 212 based on the information contained in the configuration data. In other words, when the configuration data is stored into the RF memory 206 at a first time (e.g., when the example RF communicator 204 and the example RF memory 206 are powered by an electromagnetic signal received by the example antenna 202 at a time prior to the example embedded device 102 being powered on and/or configured), at a second (later) time, the network configurer 210 picks-up the deposited configuration data and performs the configuration of the example network interface 212. For example, the configuration data may contain information that enables the example network interface 212 to communicate with the example network 110 (e.g., Wi-Fi network names, network passwords, network access keys, proxy server information, etc.). The example network configurer 210 additionally stores network configuration information in the system memory 214. For example, the network configurer 210 may store network configuration information in the system memory 214 so that the network configurer 210 may load the network configuration at a later time (e.g., during a next power on/boot of the embedded device 102 when the network interface 212 is to be configured again).

The example network interface 212 communicatively couples the example embedded device 102 with a network (e.g., the example network 110). According to the illustrated example, the network interface 212 is wireless network connection circuitry. Alternatively, the network interface 212 may be any type of network interface to a wired network, a wireless network, a local network, a wired network, an Ethernet connected network, a fiber connected network, an internet protocol network, etc.

The system memory 214 of the illustrated example stores configuration data from the example network configurer 210 and/or the example backend communicator 216. The system memory 214 may be any type of storage memory such as, for example, EEPROM, flash memory, disk storage, etc. In some implementations of the system 100, the RF memory 206 and the example system memory 214 may be combined and/or one of the RF memory 206 and/or the example system memory 214 may be eliminated.

The example backend communicator 216 retrieves configuration data from the RF memory 206 and/or the system memory 214 and communicates with the example backend server 116 via the example network interface 212 after the example network interface 212 has been configured by the example network configurer 210. According to the illustrated example, after the embedded device 102 has been powered on and the network configurer 210 has configured the network interface 212 using the configuration data, the backend communicator 216 retrieves a network address for the backend server 116 from the configuration data and contacts the backend server 116 establish a secure connection with the backend server 116 to, for example, retrieve additional configuration information for the example embedded device 102. For example, the additional configuration information may include a network address for the data repository 118 to instruct the example sensor interface 218 to transmit collected data to the data repository 118 at the identified network address. The example backend communicator 216 stores retrieved configuration data in the example system memory 214 for later access (e.g., during a subsequent power on/boot of the example embedded device 102).

The example sensor interface 218 couples the example embedded device 102 to the example sensor 104 and transmits collected data to the example data repository 118. While the example embedded device 102 includes the sensor interface 218, other implementations of the embedded device 102 may additionally or alternatively include other components to perform functionality associated with the particular implementation of an embedded device. For example, if the embedded device is a smart light bulb, the sensor interface 218 will be replaced with a component/circuitry (or multiple components/circuits) for implementing and controlling the light bulb. In other words, the sensor interface 218 is provided as a specific example representative of any number of components that may be utilized in an implementation of the embedded device 102.

While an example manner of implementing the embedded device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example RF communicator 204, the example network configurer 210, the example network interface 212, the example backend communicator 216, the example sensor interface 218 and/or more generally the example embedded device 102 may be implemented by hardware, software, firmware and/or any combination of hardware, software and/or firmware. Thus, for example, any of the example RF communicator 204, the example network configurer 210, the example network interface 212, the example backend communicator 216, the example sensor interface 218 and/or more generally the example embedded device 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, RF communicator 204, the example network configurer 210, the example network interface 212, the example backend communicator 216, and/or the example sensor interface 218 is/are hereby expressly defined to include a tangible computer readable storage device or storage disk such as a memory, a digital versatile disk (DVD), a compact disk (CD), a Blu-ray disk, etc. storing the software and/or firmware. Further still, the example embedded device 102 of FIG. 1 may include one or more elements, processes and/or devices in addition to, or instead of, those illustrated in FIG. 2, and/or may include more than one of any or all of the illustrated elements, processes and devices.

FIG. 3 is a block diagram of an example implementation of the computing device 106 of FIG. 1. The example computing device 106 of FIG. 3 is a mobile computing device that includes an example user interface 302, an example backend communicator 304, an example RF interface 306, and an example antenna 308. While the example computing device 106 of FIG. 3 is a mobile computing device, the computing device 106 may, alternatively, be any other type of computing device (e.g., a desktop computer, a server, a laptop computer, a mobile telephone, a handheld computing device, etc.).

The example user interface 302 presents graphical user interfaces on a display of the example computing device 106 to allow a user to interact with the example computing device 106. According to the illustrated example, the example user interface 302 provides a first graphical user interface for receiving user credentials for authentication, a second graphical user interface for indicating that the computing device 106 is ready to scan a new embedded device, a third graphical user interface for allowing a user to select among network profiles provided in received configuration data, a fourth graphical user interface indicating that the embedded device is being provisioned, and a fifth graphical user interface indicating that device has or has not been successfully provisioned. While the example user interface 302 provides a graphical user interface, the user interface 302 may additionally or alternatively provide any other type of interface such as a voice activated interface, a command line interface, etc.

The backend communicator 304 of the illustrated example of FIG. 3 communicatively couples the example computing device 106 to the example backend server 116 via, for example, the example network 110. The example backend communicator 304 includes a network interface, such as, for example, a wireless network interface, a wired network interface, etc. According to the illustrated example, the backend communicator 304 communicates with the example backend server 116 to authenticate a user of the example computing device 106, to transmit device identification information for the example embedded device 102 to the example backend server 116, and to receive configuration data for the example embedded device 102 from the example backend server 116. According to the illustrated example, the backend communicator 304 receives the device identification information from the embedded device 102 via the example RF interface 306 and the example antenna 308 and transmits configuration data received from the example backend server 116 to the example embedded device 102 via the example RF interface 306 and the example antenna 308. Alternatively, the backend communicator 304 may receive device identification from any other source (e.g., a user may input device identification information to the example computing device 106 via the user interface 302). Additionally or alternatively, the backend communicator 304 may transmit configuration data to the example embedded device 102 using any other interface (e.g., the backend communicator 304 may store the configuration data in a memory such as a USB flash drive that is, then, connected to the embedded device 102 to transfer and/or make available the configuration data to the embedded device 102).

The example RF interface 306 of the illustrated example of FIG. 3 communicatively couples the example backend communicator 304 with the example antenna 308 and, thereby, the example embedded device 102 via communication using the example antenna 308. The example antenna 308 transmits and/or receives an electromagnetic signal to/from the example embedded device 102. According to the illustrated example, the computing device 106 utilizes the antenna 308 to transmit, to the embedded device 102, an electromagnetic signal that has sufficient power to power to at least some components of the example embedded device 102 (e.g., the RF communicator 204 and the RF memory 206 of the example of FIG. 2). Alternatively, the antenna 308 may be replaced by another type of interface when a wireless communication between the computing device 106 and the embedded device 102 is not utilized. For example, the antenna 308 may be replaced by a port that receives a wired connection such as a Universal Serial Bus (USB) connection.

While an example manner of implementing the computing device 106 of FIG. 1 is illustrated in FIG. 3, one or more of the elements, processes and/or devices illustrated in FIG. 3 may be combined, divided, re-arranged, omitted, eliminated and/or implemented in any other way. Further, the example user interface 302, the example backend communicator 304, the example RF interface 306 and/or more generally the example computing device 106 may be implemented by hardware, software, firmware and/or any combination of hardware, software and/or firmware. Thus, for example, any of the example user interface 302, the example backend communicator 304, the example RF interface 306 and/or more generally the example computing device 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, user interface 302, the example backend communicator 304, and/or the example RF interface 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example computing device 106 of FIG. 1 may include one or more elements, processes and/or devices in addition to, or instead of, those illustrated in FIG. 3, and/or may include more than one of any or all of the illustrated elements, processes and devices.

FIG. 4 is a block diagram of an example implementation of the web server 114 of FIG. 1. The example web server 114 of FIG. 4 is a server that serves webpages to facilitate management of the example backend server 116. While the example web server 114 of FIG. 4 is a server, the web server 114 may, alternatively, be any other type of computing device (e.g., a desktop computer, a laptop computer, a mobile telephone, a handheld computing device, etc.). The example web server 114 includes an example user interface 402, an example user account interface 404, and an example configuration data interface 406.

The example user interface 402 presents graphical user interfaces on a display of the example computing device 106 to allow a user to interact with the example web server 114. According to the illustrated example, the example user interface 402 provides a first graphical user interface for receiving, deleting, or editing user credentials for the backend server 116 and a second graphical user interface for receiving, deleting, or editing configuration data (e.g., network profiles) stored at the backend server 116. While the example user interface 402 provides a graphical user interface, the user interface 402 may additionally or alternatively provide any other type of interface such as a voice activated interface, a command line interface, etc.

The example user account interface 404 receives user account information from the example user interface 402 (e.g., account information input by a user (e.g., an administrator) of the example web server 114) and transmits the user account information to the example backend server 116 (e.g., the user account interface 404 may communicate with a database of the example backend server 116 via the example network 110). For example, the user account interface 404 may transmit a request to add a new user account, a request to modify an existing user account (e.g., to change a password), and/or a request to delete a user account.

The example configuration data interface 406 receives configuration data from the example user interface 402 (e.g., configuration data such as a network configuration data input by a user (e.g., an administrator) of the example web server 114) and transmits the configuration data to the example backend server 116 (e.g., the configuration data interface 406 may communicate with a database of the example backend server 116 via the example network 110). For example, the configuration data interface 406 may transmit a request to add a new network configuration to a profile of configuration data for embedded devices, a request to modify a profile of configuration data, and/or a request to delete a profile of configuration data.

While an example manner of implementing the web server 114 of FIG. 1 is illustrated in FIG. 4, one or more of the elements, processes and/or devices illustrated in FIG. 4 may be combined, divided, re-arranged, omitted, eliminated and/or implemented in any other way. Further, the example user interface 402, the example user account interface 404, the example configuration data interface 406 and/or more generally the web server 114 may be implemented by hardware, software, firmware and/or any combination of hardware, software and/or firmware. Thus, for example, any of the example user interface 402, the example user account interface 404, the example configuration data interface 406 and/or more generally the web server 114 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, user interface 402, the example user account interface 404, and/or the example configuration data interface 406 is/are hereby expressly defined to include a tangible computer readable storage device or storage disk such as a memory, a digital versatile disk (DVD), a compact disk (CD), a Blu-ray disk, etc. storing the software and/or firmware. Further still, the example web server 114 of FIG. 1 may include one or more elements, processes and/or devices in addition to, or instead of, those illustrated in FIG. 4, and/or may include more than one of any or all of the illustrated elements, processes and devices.

FIG. 5 is a block diagram of an example implementation of the example backend server 116 of FIG. 1. The example backend server 116 of FIG. 5 includes an example registration handler 502, an example embedded device configuration handler 504, and an example configuration store 506.

The example registration handler 502 of the illustrated example of FIG. 5 receives user account information and/or changes to user account information from the example web server 114 and stores the user account information in the example configuration store 506. The example registration handler 502 additionally receives requests to authenticate user account information from the example computing device 106 and verifies the user account information associated with the request using the user account information stored in the example configuration store 506.

The example embedded device configuration handler 504 of FIG. 5 receives embedded device configuration data from the example web server 114 (e.g., network configuration data) and stores the embedded device configuration data in the example configuration store 506. The example embedded device configuration handler 504 additionally responds to requests for configuration information for the embedded device 102 from the example computing device 106 by linking a device identifier received in the request with a user account that made the request and retrieving/sending configuration data for the embedded device 102 to the example computing device 106.

The example configuration store 506 of the illustrated example is a database for storing user account information and embedded device configuration data. Alternatively, the configuration store 506 may be any type of data storage such as an optical storage, a disk storage, a flash memory, a file, etc.

While an example manner of implementing the backend server 116 of FIG. 1 is illustrated in FIG. 5, one or more of the elements, processes and/or devices illustrated in FIG. 5 may be combined, divided, re-arranged, omitted, eliminated and/or implemented in any other way. Further, the example registration handler 502, the example embedded device configuration handler 504 and/or more generally the backend server 116 may be implemented by hardware, software, firmware and/or any combination of hardware, software and/or firmware. Thus, for example, any of the example registration handler 502, the example embedded device configuration handler 504 and/or more generally the backend server 116 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, registration handler 502 and/or the example embedded device configuration handler 504 is/are hereby expressly defined to include a tangible computer readable storage device or storage disk such as a memory, a digital versatile disk (DVD), a compact disk (CD), a Blu-ray disk, etc. storing the software and/or firmware. Further still, the example backend server 116 of FIG. 1 may include one or more elements, processes and/or devices in addition to, or instead of, those illustrated in FIG. 5, and/or may include more than one of any or all of the illustrated elements, processes and devices.

Figure 6:
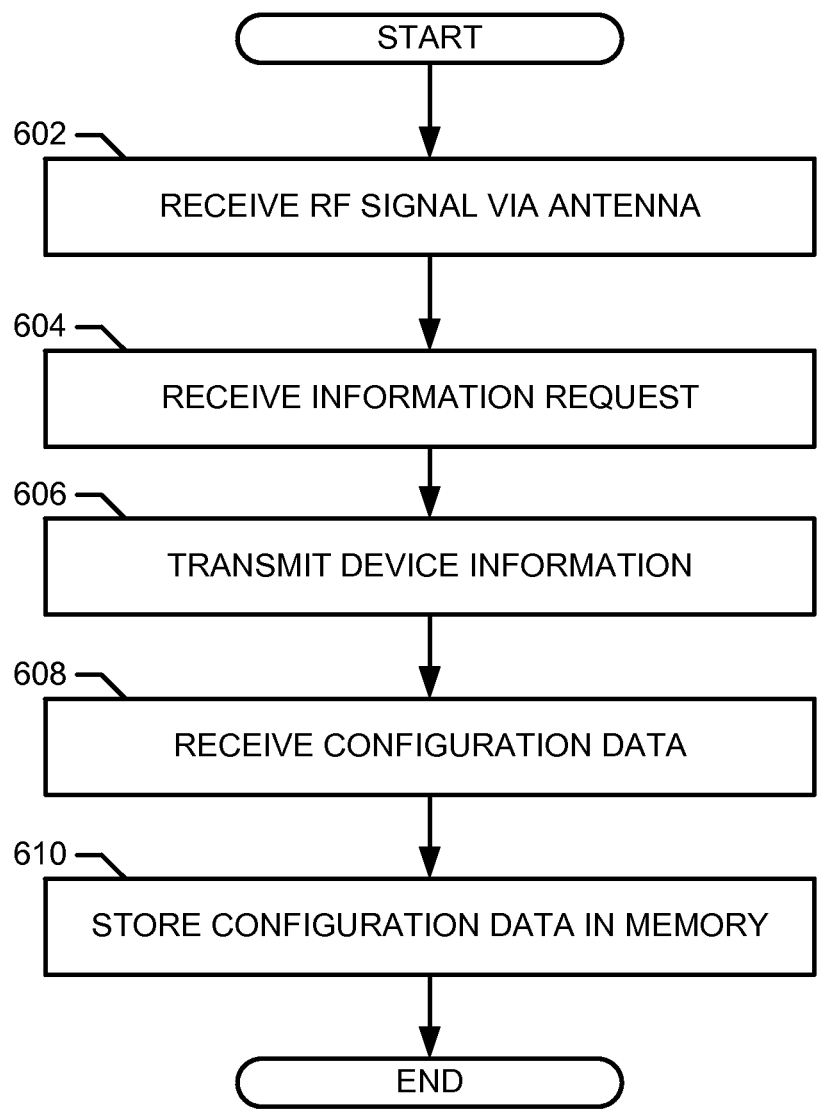
FIGS. 6-7 are flowcharts representative of example machine readable instructions which may be executed to implement the example embedded device of FIGS. 1 and/or 2 to configure the example embedded device of FIGS. 1 and/or 2.
Figure 7:
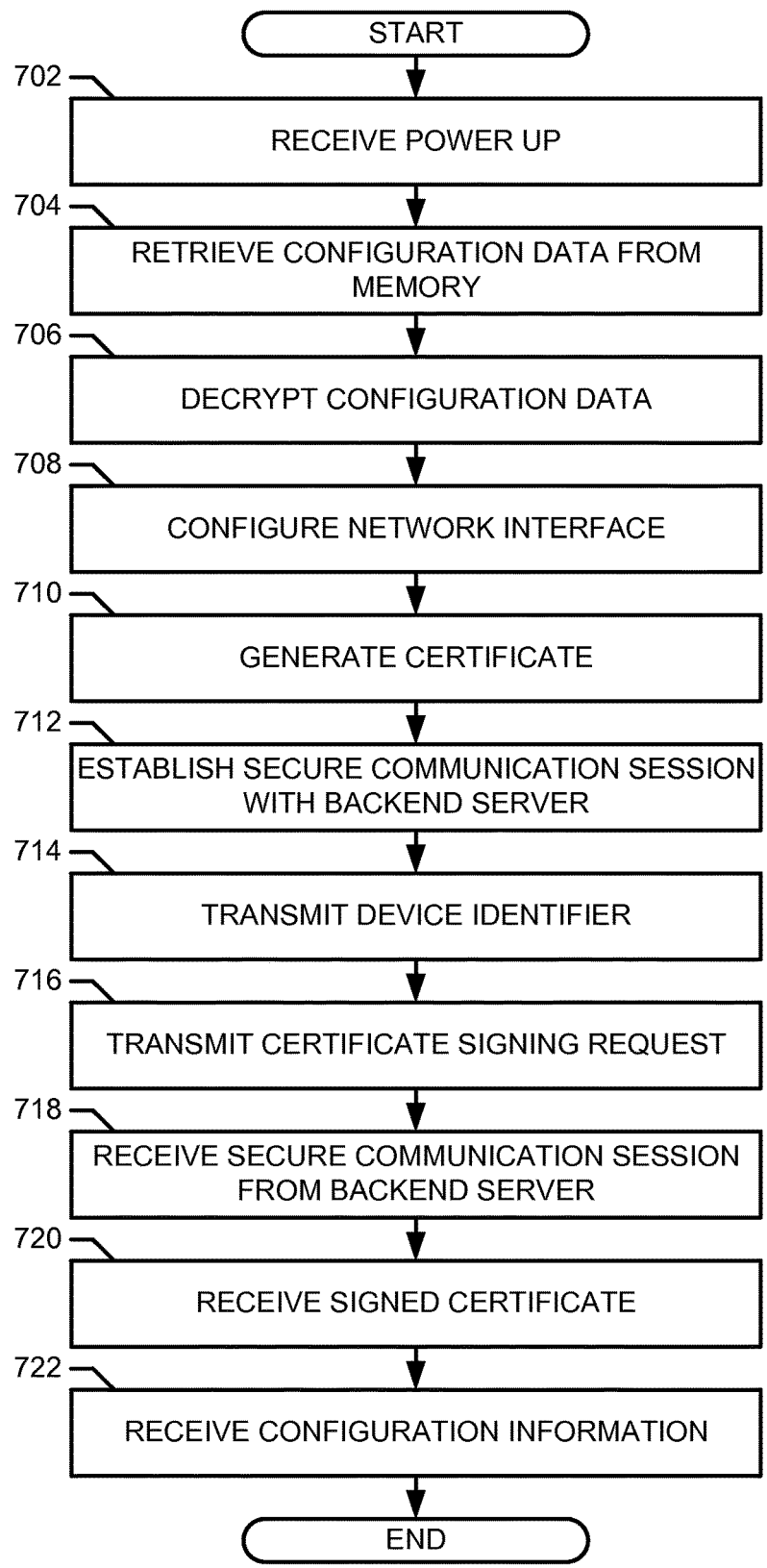

Flowcharts representative of example machine readable instructions for implementing the embedded device 102 of FIGS. 1 and/or 2 are shown in FIGS. 6-7. In this example, the machine readable instructions comprise a program for execution by a processor such as the processor 1412 shown in the example processor platform 1400 discussed below in connection with FIGS. 6-7. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 6-7, many other methods of implementing the example embedded device 102 may alternatively be used. For example, the order of execution of the blocks may be changed, and/or some of the blocks described may be changed, eliminated, or combined.

As mentioned above, the example processes of FIGS. 6-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

According to the illustrated example of FIG. 6, the program of FIG. 6 is performed during deployment of the example embedded device 102 (e.g., prior to the embedded device 102 being powered on for the first time). The program of FIG. 6 begins when the example antenna 202 receive an RF signal (e.g., an electromagnetic signal output by the example computing device 106) (block 602). The RF signal provides, via the example antenna 202, power to the example RF communicator 204 and the example RF memory 206. The RF communicator 204 receives a request for information that is included in the RF signal (block 604). According to the illustrated example, the request for information includes a request for identification information associated with the example embedded device 102. The RF communicator 204 retrieves the requested information from the example RF memory 206 and transmits the information (e.g., a device identifier) to the source of the request (e.g., the computing device 106) using an RF signal emitted by the antenna 202 (block 606).

The RF communicator 204 then receives, via the antenna 202, configuration data that is transmitted to the embedded device 102 (block 608). For example, the computing device 106 may retrieve configuration data (e.g., from the backend server 116) and transmit the configuration data to the embedded device 102 via a further RF signal. The example RF communicator 204 stores the received configuration data in the example RF memory 206 (block 610). The program of FIG. 6 then ends. Accordingly, at the completion of the program of FIG. 6, the configuration data is stored in the RF memory 206 awaiting the powering on of the embedded device 102 at which time the configuration data will be picked up from the RF memory 206 and processed by the example network configurer 210 and the example backend communicator 216 as described in conjunction with the flowchart of FIG. 7.

The example program of FIG. 7 is performed by the embedded device 102 to configure the embedded device 102 using configuration data received from, for example, the example computing device 106. According to the illustrated example, the program of FIG. 7 is performed after the configuration data has been stored at the embedded device (e.g., after the program of FIG. 6 has been performed). The example program of FIG. 7 is intended to be performed once at the time that the embedded device 102 is first deployed. Alternatively, the program of FIG. 7 may be performed each time the embedded device 102 is powered on (e.g., in implementations in which configuration of the embedded device 102 is desired or required (e.g., where configuration data is stored in volatile memory) during each power on).

The program of FIG. 7 begins when the network configurer 210 and the example backend communicator 216 receive power from the example power source 208 (block 702). According to the illustrated example, the embedded device 102 is powered on when a battery (the example power source 208) is inserted into the embedded device 102. Alternatively, the power source 208 may be any other type of power source and the embedded device 102 may be powered on in any other manner (e.g., a switch may be moved from an off position to an on position, an instruction to power on may be received by the embedded device (e.g., may be received by a power control component), etc.).

The example network configurer 210 then retrieves configuration data from the RF memory 206 (block 704). According to the illustrated example, the configuration data has been previously stored in the RF memory 206 by the execution of the program of FIG. 6 or a similar process. Alternatively, the configuration data may have been stored using any other process (e.g., the configuration data may be stored in the RF memory 206 by transferring data from a portable storage device (e.g., a USB flash drive) to the RF memory 206, by manufacturing the RF memory 206 with the configuration data stored, etc. Additionally or alternatively, the configuration data could be retrieved from another location (e.g., the configuration data could be stored in the example system memory 214, could be stored at a remote location (e.g., a network location that is known to the network configurer 210 and accessible using default network configuration information known to the network configurer 210), etc.).

According to the illustrated example, the configuration data retrieved in block 704 is encrypted and, thus, the network configurer 210 decrypts the configuration data (block 706). Alternatively, if the configuration data is not encrypted, block 706 may be removed. After obtaining the unencrypted configuration data, the network configurer 210 configures the example network interface 212 (block 708). For example, the network configurer 210 may retrieve a wireless network name and wireless network authentication parameter from the configuration data and may configure the network interface 212 to access the identified wireless network utilizing the wireless network authentication parameters. Alternatively, any other configuration of the network interface 212 may be performed depending on the type of the network interface 212.

After the network interface 212 has been configured by the network configurer 210 (block 708), the example backend communicator 216 generates a certificate for the embedded device 102 (block 710). For example, the certificate may be a self-signed digital certificate that may be used to authenticate network communications associated with the embedded device 102. The backend communicator 216 then establishes a secure communication session with the backend server 116 via the network interface 212 (block 712). For example, the backend communicator 216 may determine a network address for the example backend server 116 from the configuration data (e.g., by retrieving the configuration data from the RF memory 206 or from the system memory 214). The secure session may be, for example, a server authenticated transport layer security (TLS) session, a secure sockets layer (SSL) session, etc.

The backend communicator 216 then transmits device identification information (e.g., a device identifier) or the embedded device 102 to the backend server 116 via the network interface 212 (block 714). For example, the backend communicator 216 may retrieve the device identifier from the RF memory 206 and/or the system memory 214, may receive a device identifier or other identification information from a user input, etc. The backend communicator 216 also transmits a certificate signing request for the certificate generated in block 710 (block 716). For example, the certificate signing request may be transmitted to the backend server 116 or another server (e.g., a certificate authority) that can sign the certificate.

In response to establishing the secure communication session (block 712), the backend communicator 216 receives a request for a mutual secure communication session from the backend server 116 and establishes the mutual secure communication session (block 718). For example, the mutual secure communication session can facilitate encryption of communications between the embedded device 102 and the backend server 116. The example backend communicator 216 receives the signed certificate signing request from the backend server 116 (block 720). For example, the backend communicator 216 may store the signed certificate in the system memory 214 for use in authenticating communications sent by the embedded device 102.

According to the illustrated example, the backend communicator 216 then receives additional configuration for the embedded device 102 from the backend server 116 (block 722). For example, the backend communicator 216 may store the additional configuration information in the system memory 214 and/or may perform configuration of the embedded device 102 based on the additional configuration information (e.g., may perform configuration of the example sensor interface 218). In some implementations, no additional configuration information may be needed. In some implementations, the configuration information may be received from a source in other than the backend server 116 or an additional source. For example, additional configuration information may be received from the data repository 118, from a server managed by the end user of the embedded device 102, etc.

The program of FIG. 7 then ends.

Figure 8:
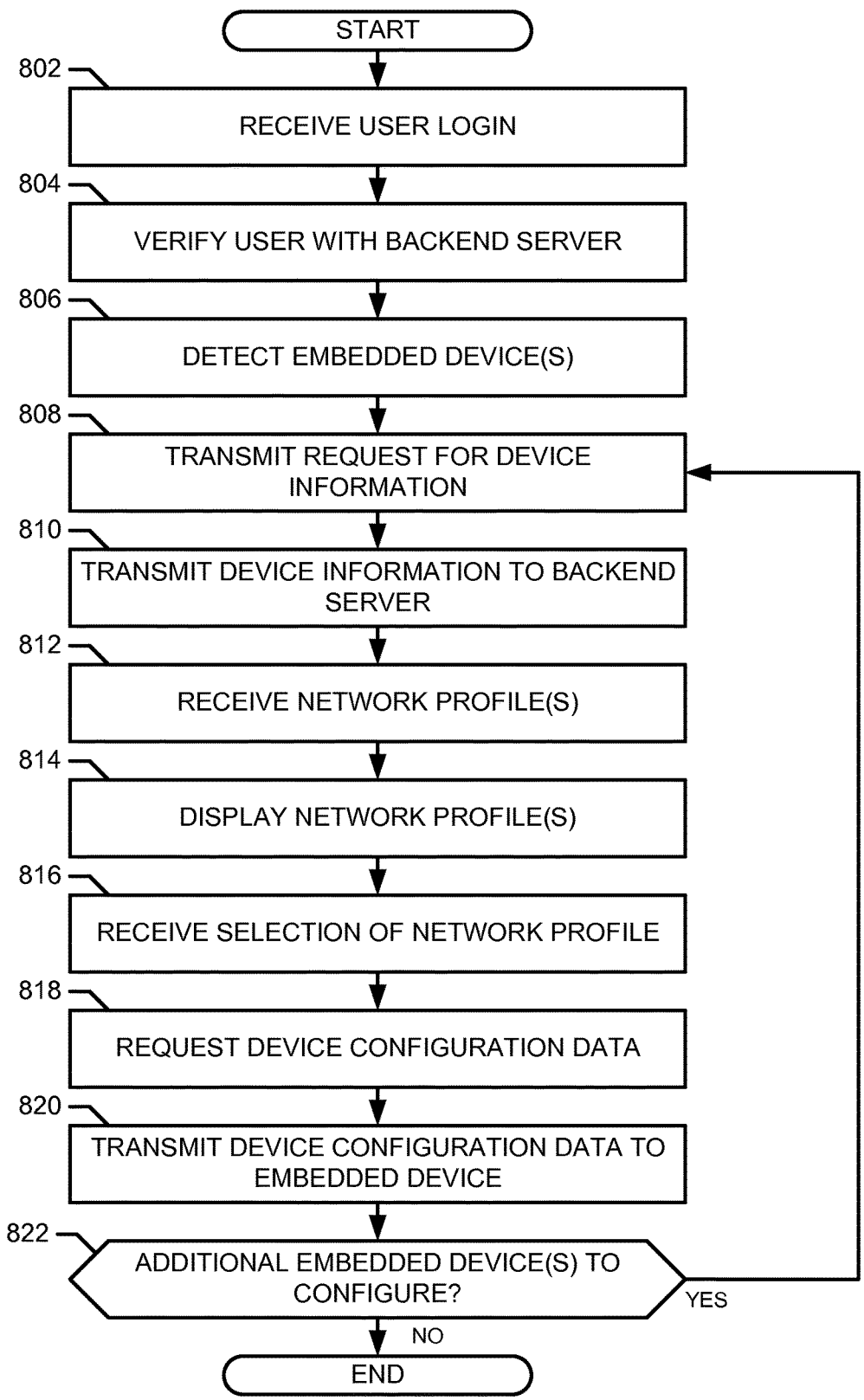
FIG. 8 is a flowchart representative of example machine readable instructions which may be executed to implement the example computing device of FIGS. 1 and/or 3 to configure the example embedded device of FIGS. 1 and/or 2.

A flowchart representative of example machine readable instructions for implementing the computing device 106 of FIGS. 1 and/or 3 are shown in FIG. 8. In this example, the machine readable instructions comprise a program for execution by a processor such as the processor 1512 shown in the example processor platform 1500 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 8, many other methods of implementing the example computing device 106 may alternatively be used. For example, the order of execution of the blocks may be changed, and/or some of the blocks described may be changed, eliminated, or combined.

As mentioned above, the example processes of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

According to the illustrated example of FIG. 8, the program of FIG. 8 is performed during deployment of the example embedded device 102 (e.g., prior to the embedded device 102 being powered on for the first time). The program of FIG. 8 begins when the example user interface 302 receives user credentials via a provided user interface (block 802). The example backend communicator 304 communicates with the backend server 116 to verify the user credentials (block 804). For example, if the user credentials cannot be verified (e.g., they are incorrect or the backend server 116 is not available), the backend communicator 304 could request, via the user interface 302, that the user try to input their user credentials again.

The RF interface 306 then, via the antenna 308, detects the presence of the embedded device 102 and/or a plurality of the embedded devices 102 (block 804). For example, the RF interface 306 may transmits, via the antenna 308, an interrogating electromagnetic signal that will power the embedded device 102 (e.g., the RF communicator 204 and the RF memory 206 of the example embedded device 102 of FIG. 2) when it is nearby the computing device 106. The RF interface 306 includes, in the interrogating electromagnetic signal, a request that the embedded device 102 respond by transmitting a device identifier for the embedded device 102 (block 808). The backend communicator 304 then transmits the received device identifier to the backend server 116 (block 810). In response to transmitting the device identifier, the backend communicator 304 receives a network profile (or a plurality of network profiles) from the backend server 116 (block 812). The user interface 302 presents the network profile(s) to allow the user to approve the network profile and/or select among a plurality of network profiles (block 814).

In response to presenting the network profile(s) (block 814), the backend communicator 304 receives, via the user interface 302, an approval the network profile or selection of one of the network profiles (block 816). The example backend communicator 304 transmits the identification of the selected network profile to the backend server 116 with a request for configuration data for the embedded device 102 (block 818). Upon the backend communicator 216 receiving the configuration data from the backend server 116, the RF interface 306 transmits the configuration data to the embedded device 102 via the antenna 308 (block 820).

After transmitting the configuration data (block 820), the RF interface 306 determines if there is a further embedded device 102 to configure (block 822). For example, the RF interface 306 may determine that multiple devices were identified during the interrogation performed in block 806 and/or block 808. Additionally or alternatively, the RF interface 306 may perform a further interrogation via the antenna 308 to determine if any additional embedded devices 102 are identified. The RF interface 306 may determine that additional embedded devices are available for configuration by comparing identified embedded devices 102 to a list of previously configured embedded devices 102 that is stored at the computing device 106 or another location (e.g., a list stored at the backend server 116). Alternatively, the RF interface 306 may determine from a response received from an embedded device 102 that the device is awaiting configuration (e.g., by a flag set in a response received from the embedded device 102). Alternatively, the embedded device 102 may be configured (e.g., the RF communicator 204 may be configured) to not respond to interrogation requests once the embedded device 102 has been configured.

If there are additional embedded devices 102 to configure (block 822), control returns to block 808 to configure the next embedded device 102. Alternatively, if there are no further embedded devices 102 to configure the program of FIG. 8 ends or the user interface 302 presents an interface to a user to request the user to provide a further instruction (e.g., an instruction to perform a further interrogation).

Figure 9:
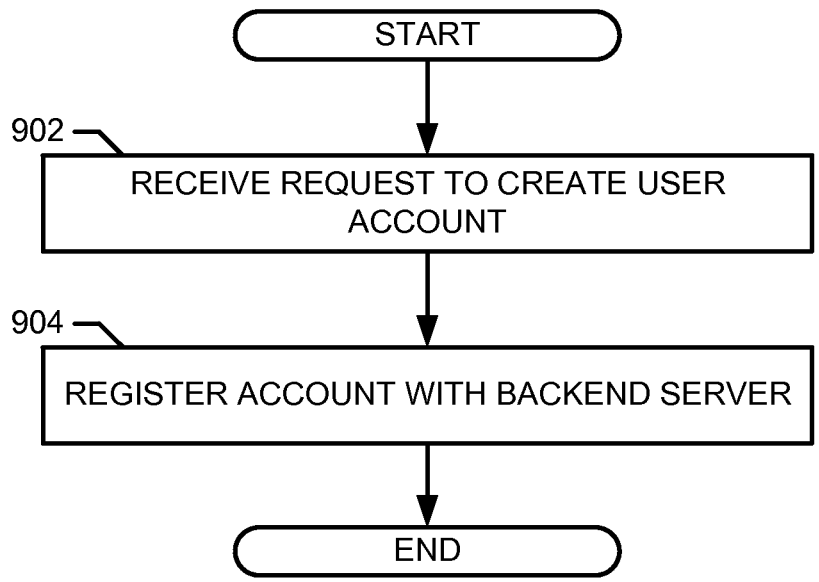
FIGS. 9-10 are flowcharts representative of example machine readable instructions which may be executed to implement the example web server of FIGS. 1 and/or 4.
Figure 10:
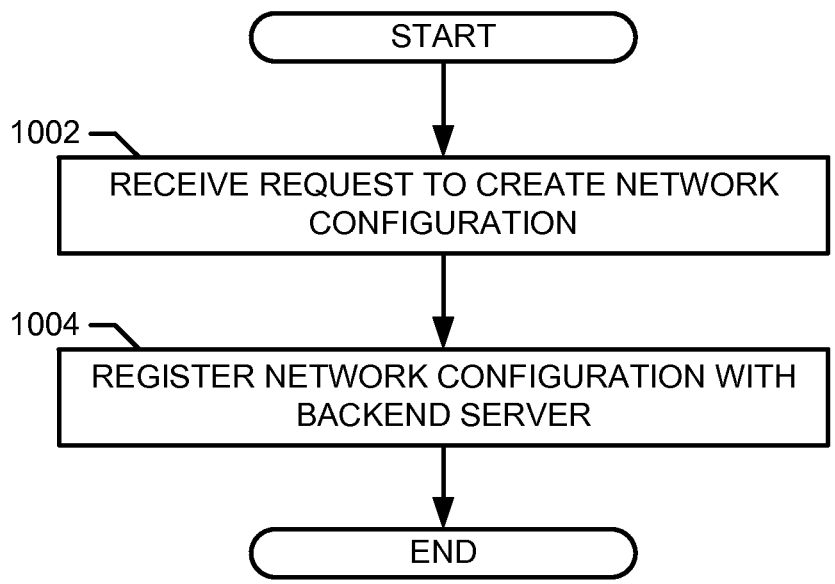

Flowcharts representative of example machine readable instructions for implementing the web server 114 are shown in FIGS. 9-10. In this example, the machine readable instructions comprise a program for execution by a processor such as the processor 1612 shown in the example processor platform 1600 discussed below in connection with FIGS. 9-10. The program may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 9-10, many other methods of implementing the example web server 114 may alternatively be used. For example, the order of execution of the blocks may be changed, and/or some of the blocks described may be changed, eliminated, or combined.

As mentioned above, the example processes of FIGS. 9-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 9 begins when the example user interface 402 of the example web server 114 of FIG. 4 receives a request to create a new user account (block 902). The user account interface 404 then registers the new account with the backend server 116 (block 904). The program of FIG. 9 then ends. While the example flowchart of FIG. 9 illustrates a process for creating a user account, the web server 114 may additionally facilitate deleting a user account at the backend server 116, editing an existing user account, etc.

The program of FIG. 10 begins when the example user interface 402 of the example web server 114 of FIG. 4 receives a request to create a new network configuration (e.g., a new network profile) (block 1002). The configuration data interface 406 then registers the new network configuration with the backend server 116 (block 1004). The program of FIG. 10 then ends. While the example flowchart of FIG. 10 illustrates a process for creating a new network configuration, the web server 114 may additionally facilitate deleting a network configuration at the backend server 116, editing an existing network configuration, etc.

Figure 11:
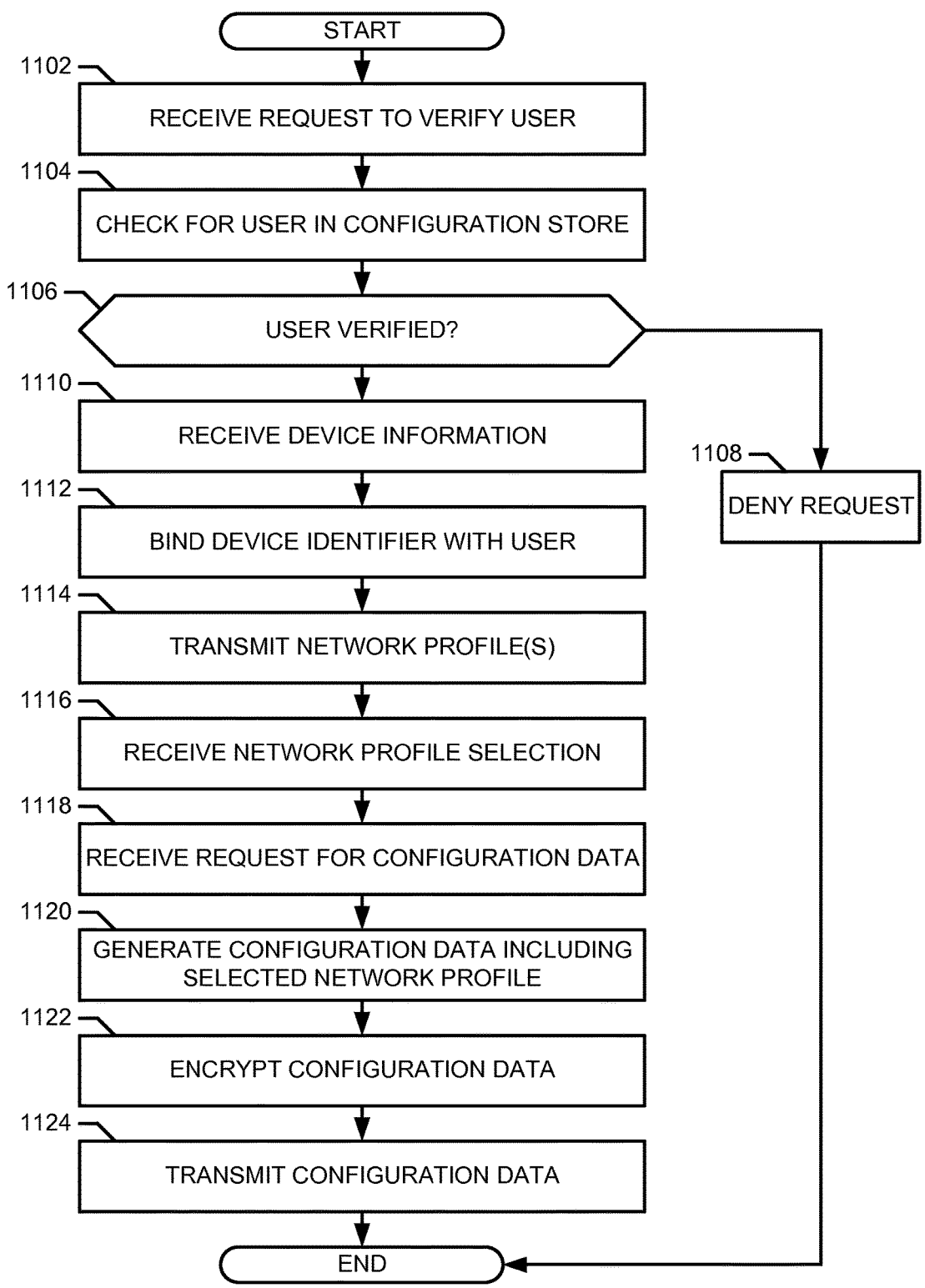
FIGS. 11-12 are flowcharts representative of example machine readable instructions which may be executed to implement the example backend server of FIGS. 1 and/or 5 to configure the example embedded device of FIGS. 1 and/or 2.
Figure 12:
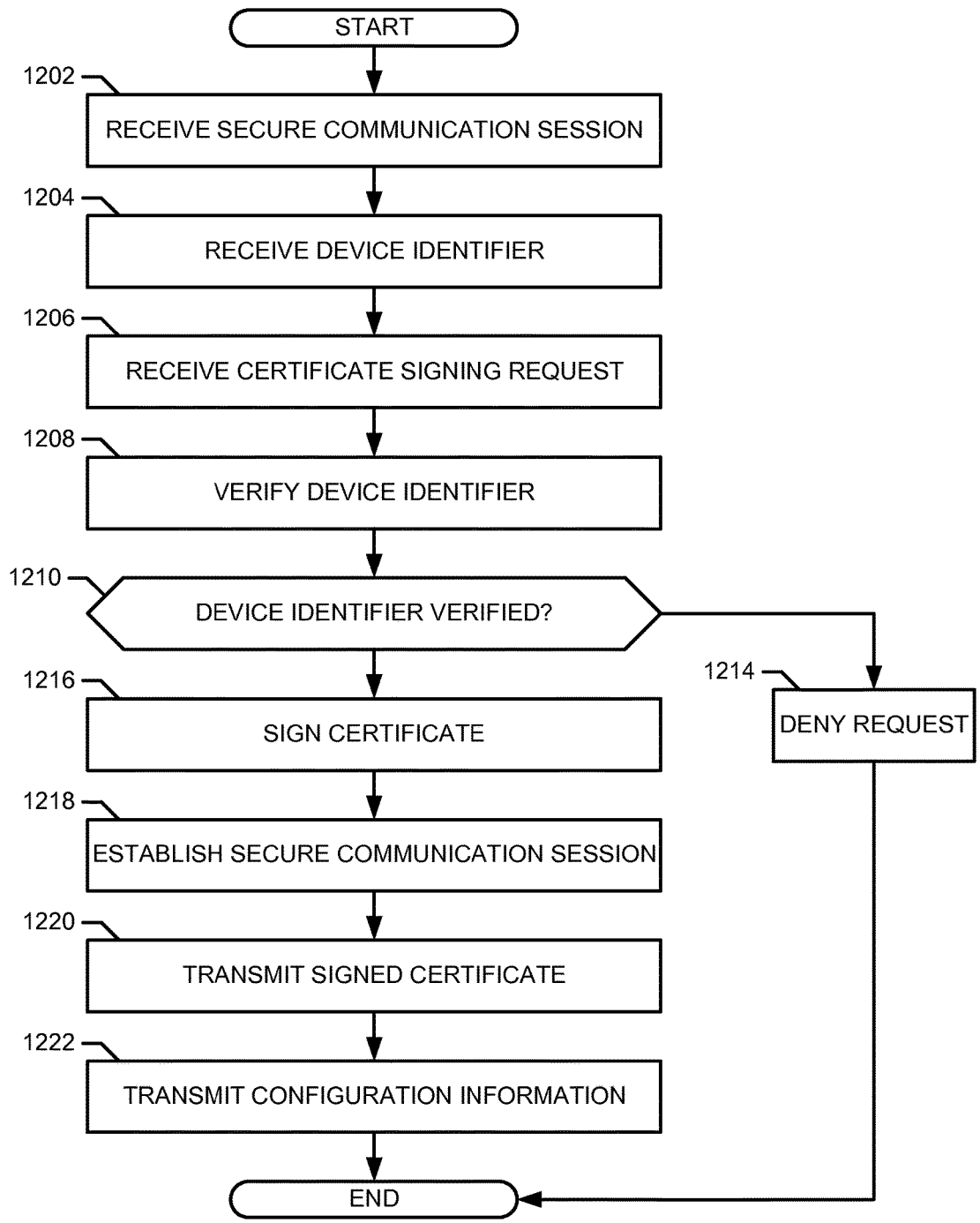

Flowchart representative of example machine readable instructions for implementing the backend server 116 are shown in FIGS. 11-12. In this example, the machine readable instructions comprise a program for execution by a processor such as the processor 1712 shown in the example processor platform 1700 discussed below in connection with FIGS. 11-12. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 11-12, many other methods of implementing the example backend server 116 may alternatively be used. For example, the order of execution of the blocks may be changed, and/or some of the blocks described may be changed, eliminated, or combined.

As mentioned above, the example processes of FIGS. 11-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 11 begins when the registration handler 502 receives, from the example computing device 106, a request to verify user credentials (block 1102). For example, the user credential may be a username and password input to the example computing device 106 by a user of the computing device 106. The registration handler 502 then determines if the received user credentials match a user stored in the configuration store 506 (block 1104). The registration handler 502 may additionally determine if the configuration store 506 indicates that the user is authorized for deploying embedded devices such as the embedded device 102. User information may be stored in the configuration store 506 by the user account interface 404 of the example web server 114. When the received user credentials do not match a user in the example configuration store 506 (or a matched user does not have authorization to deploy embedded devices), the registration handler 502 sends a denial of the request to the computing device 106 (block 1108) and the program of FIG. 11 ends.

When the received user credentials match an authorized user identified in the configuration store 506 (block 1106), the example registration handler 502 receives device information (e.g., a device identifier) for the embedded device 102 that that the computing device 106 is attempting to deploy (block 1110). The example registration handler 502 then stores an association of the device information (e.g., the device identifier) and the identified user in the configuration store 506 to bind the user and the embedded device 102 (block 1112). The embedded device configuration handler 504 then retrieves a network profile(s) from the configuration store 506 and transmits the network profile(s) to the computing device 106 (block 1114). For example, the network profiles may be associated with the user (e.g., network profiles that have previously been input by the user at the web server 114 and stored in the configuration store 506 by the example configuration data interface 406 of FIG. 4).

In response to transmitting the network profile(s) (block 1114), the embedded device configuration handler 504 receives a selection of a network profile from the computing device 106 (block 1116). The embedded device configuration handler 504 additionally receives, from the computing device 106, a request for configuration data for the embedded device 102 (block 1118). The embedded device configuration handler 504 then generates configuration data including the selected network profile (block 1120). Alternatively, the embedded device configuration handler 504 may retrieve a previously generated configuration data that is associated with the selected network profile. The embedded device configuration handler 504 then encrypts the configuration data (block 1122). For example, the configuration data may be encrypted using encryption parameters known to the embedded device 102 so that the embedded device 102 can decrypt the configuration data but other computing devices (e.g., the computing device 106) are not capable of accessing the configuration data, which may be include secure information such as passwords. In other examples, information needed to decrypt the configuration data may be made available in another matter (e.g., an encryption key could be mailed to a registered address or electronic mail address of the user).

After the configuration data is encrypted (block 1122), the configuration data is transmitted to the computing device 106 for transmission to the embedded device 102 (block 1124). For example, the configuration data may be transmitted by the computing device 106 to the embedded device 102 at block 820 of FIG. 8 and received by the embedded device 102 at block 608 of FIG. 6. The program of FIG. 11 then ends.

The program of FIG. 12 may be executed to establish communication between the example backend server 116 and the embedded device 102 once the embedded device 102 is powered on. According to the illustrated example, the program of FIG. 12 is performed after the embedded device 102 has been deployed (e.g., after the programs of FIGS. 6, 8, and 11 have been performed).

The program of FIG. 12 begins when the example registration handler 502 of the example backend server 116 receives a secure communication session from the example embedded device 102 (block 1202). The registration handler 502 then receives device information (e.g., a device identifier) for the embedded device 102 from the embedded device 102 via the secure communication session (block 1204). Additionally, the registration handler 502 receives a certificate signing request for a certificate generated by the embedded device 102 (block 1206).

The registration handler 502 then determines if the device information (e.g., the device identifier) matches a recorded device identifier (e.g., a device identifier bound to a user) in the example configuration store 506) to verify that the device information belongs to an embedded device for which provisioning/deployment has been initiated (block 1208). When the device information is not verified, the registration handler 502 transmits a message to the embedded device denying the request (block 1214).

When the device information (e.g., the device identifier) is verified (block 1210), the registration handler 502 signs the certificate signing request (block 1216). For example, the registration handler 502 may sign the request using certificate authority capabilities of the backend server 116. Alternatively, the registration handler 502 may transmit the certificate signing request to a certificate authority with an instruction that the certificate is authorized to be signed.

The example registration handler 502 then establishes a secure communication session with the embedded device 102 (block 1218). For example, the registration handler 502 may establish a mutual secure communication session responsive to the secure communication session received at block 1202. The registration handler 502 transmits the signed certificate to the embedded device 102 (block 1220). The embedded device configuration handler 504 then retrieves the configuration data corresponding to the device information (e.g., the device identifier) from the configuration store 506 and transmits the configuration data to the embedded device 102 (block 1222). The program of FIG. 12 then ends.

Figure 13:
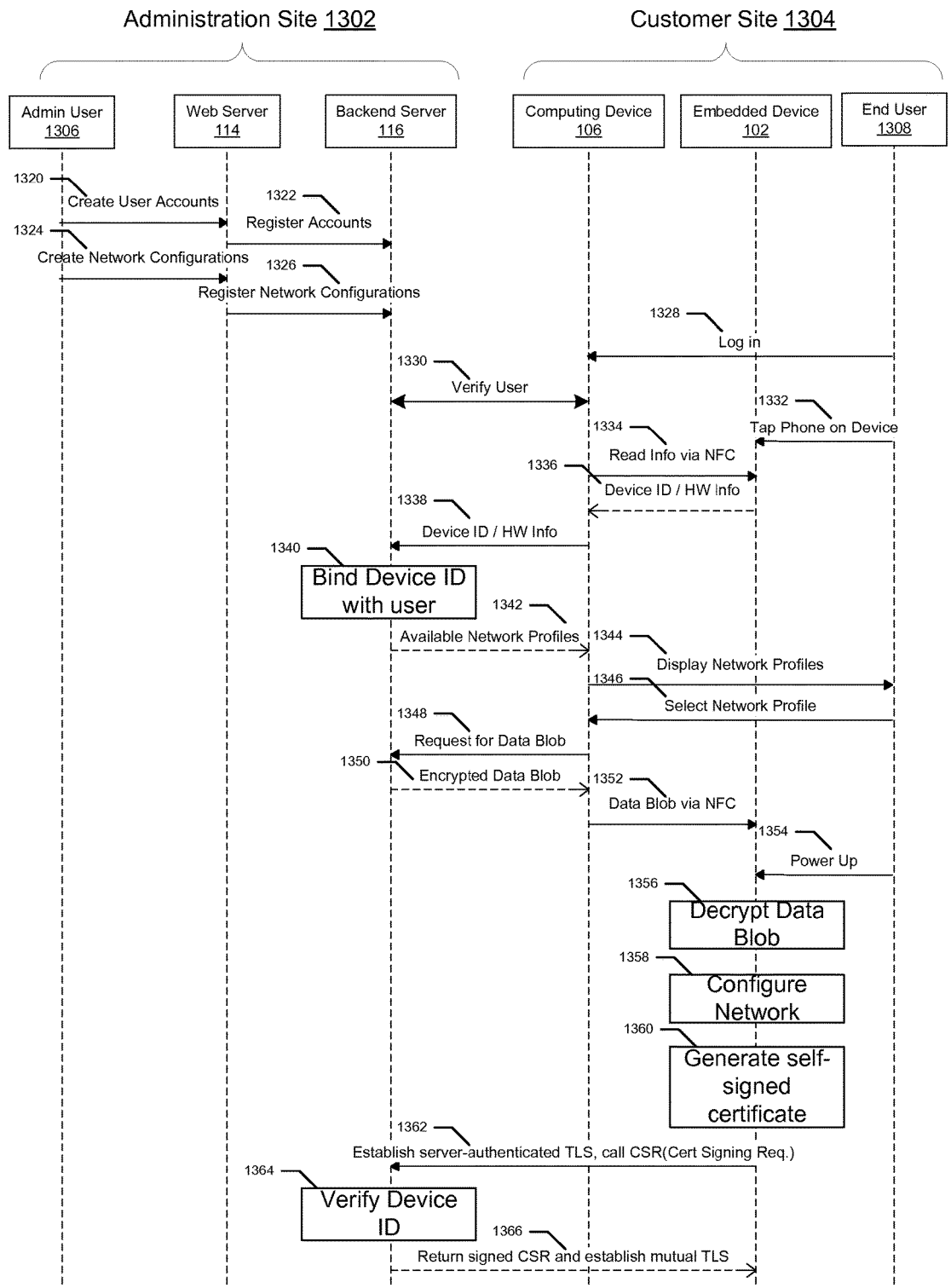
FIG. 13 is a message flow diagram illustrating communication among the example embedded device of FIGS. 1 and/or 2, the example computing device of FIGS. 1 and/or 3, the example web server of FIGS. 1 and/or 4, and the example backend server of FIGS. 1 and/or 5.

FIG. 13 is a message flow diagram illustrating communication among the example embedded device 102, the example computing device 106, the example web server 114, and the example backend server 116. According to the illustrated example, an admin user 1306, the example web server 114, and the example backend server 116 are located at an example administration site 1302 and an end user 1308, the example embedded device 102, and the example computing device 106 are located at an example customer site 1304.

The flow of the example of FIG. 13 begins during registration of user accounts when the admin user 1306 inputs a request to create a new user account using the user interface 402 of the example web server 114 (message 1320). The example user account interface 404 of the example web server transmits a request to register the input user account to the example registration handler 502 of the example backend server 116 (message 1322). Additionally, the example admin user 1306 inputs a request to create a new network configuration using the user interface 402 of the example web server 114 (message 1324). The example configuration data interface 406 a request to register the network configuration to the example embedded device configuration handler 504 of the example backend server 116 (message 1326).

At some later time, the example end user 1308 logs in to the computing device 106 be entering credentials via the example user interface 302 (message 1328). The backend communicator 304 of the example computing device 106 verifies the received credentials with the example backend server 116 (message 1330). If the credentials are valid, the end user 1308 is authenticated and ready to configure the embedded device 102. The example end user then taps the computing device 106 (e.g., an NFC enabled mobile phone) on the embedded device 102 (action 1332). According to the illustrated example, tapping the computing device 106 on the embedded device 102 (or bringing the computing device 106 very close to the embedded device 102) triggers the RF interface 306 and the antenna 308 allows the computing device 106 to recognize the presence of the embedded device 102. For example, the computing device 106 may transmit an electromagnetic signal that is capable of powering components of the embedded device 102, but may not be sufficient (as a limitation or by design) to power the components unless the computing device 106 is in very close proximity to the embedded device 102 (e.g., using NFC technology).

The computing device 106 then requests device identification information from the embedded device 102 (message 1334). For example, the request for device identification information may be transmitted by the RF interface 306 via the antenna 308 of the example computing device 106. In response to the request, the RF interface 306 receives, via the antenna 308, device identification information retrieved from the RF memory 206 and transmitted by the example RF communicator 204 of the embedded device 102 (message 1336). The backend communicator 304 of the example computing device 106 transmits the device identification information (and any other collected hardware information for the embedded device 102) to the backend server 116 (message 1338).

Upon receiving the device identification information, the example registration handler 502 of the example backend server 116 binds the device identification information with the user information transmitted in message 1330 (e.g., by storing an association of the device identification information and the user in the configuration store 506 (block 1340). The embedded device configuration handler 504 then transmits available network profiles to the computing device 106 (message 1342). The user interface 402 displays available network profiles to the end user 1308 (message 1344). The user inputs a selection of a network profile via the user interface 402 (message 1346).

The backend communicator 304 of the example computing device 106 then transmits a request for a data blob (e.g., a data blob of configuration data) to the example backend server 116 (message 1348). For example, the request for the data blob may include an identification of the network profile selected by the end user 1308. In response to the request, the embedded device configuration handler 504 retrieves and/or generates an encrypted data blob and transmits the encrypted data block to the computing device 106 (message 1350). The RF interface 306 then transmits, via the antenna 308, the encrypted data blob to the embedded device 102 (message 1352). For example, the RF communicator 204 of the example embedded device 102 may receive the encrypted data blob via the antenna 202 and may store the encrypted data blob in the RF memory 206. Thus, the embedded device 102 has been loaded with a data blob that can be used for configuring the embedded device 102.

At some later, the end user 1308 instructs the embedded device 102 to power on (message 1354). The example network configurer 210 then retrieves the encrypted data blob from the RF memory 206 and decrypts the encrypted data blob (block 1356). For example, the network configurer 210 may store the decrypted data blob in the example system memory 214. The network configurer 210 then utilizes the information contained in the decrypted data blob to configure the example network interface 212 (block 1358). The example backend communicator 216 then generates a self-signed certificate for the embedded device 102 (block 1360).

The example backend communicator 216 establishes a server-authenticated TLS session with the backend server 116 and transmits a certificate signing request for the generated self-signed certificate (message 1362). The message 1362 includes device identification information for the embedded device 102. The example registration handler 502 verifies that the device identification information can be matched to device identification information previously stored in the example configuration store 506 (e.g., the device identification information transmitted to the example backend server 116 in message 1338) (block 1364). If the device identification information is verified, the registration handler 502 establishes a mutual TLS session and transmits the signed certificate signing request (message 1366). The flow of FIG. 13 then ends. Alternatively, the message flow could continue providing additional configuration information and/or maintaining communication with the embedded device 102.

The message flow of FIG. 13 is provided as an example of one flow of messages among the example embedded device 102, the example computing device 106, the example web server 114, and the example backend server 116. Alternatively, many other message flows may be implemented and/or the order of the messages of FIG. 13 may change.

Figure 14:
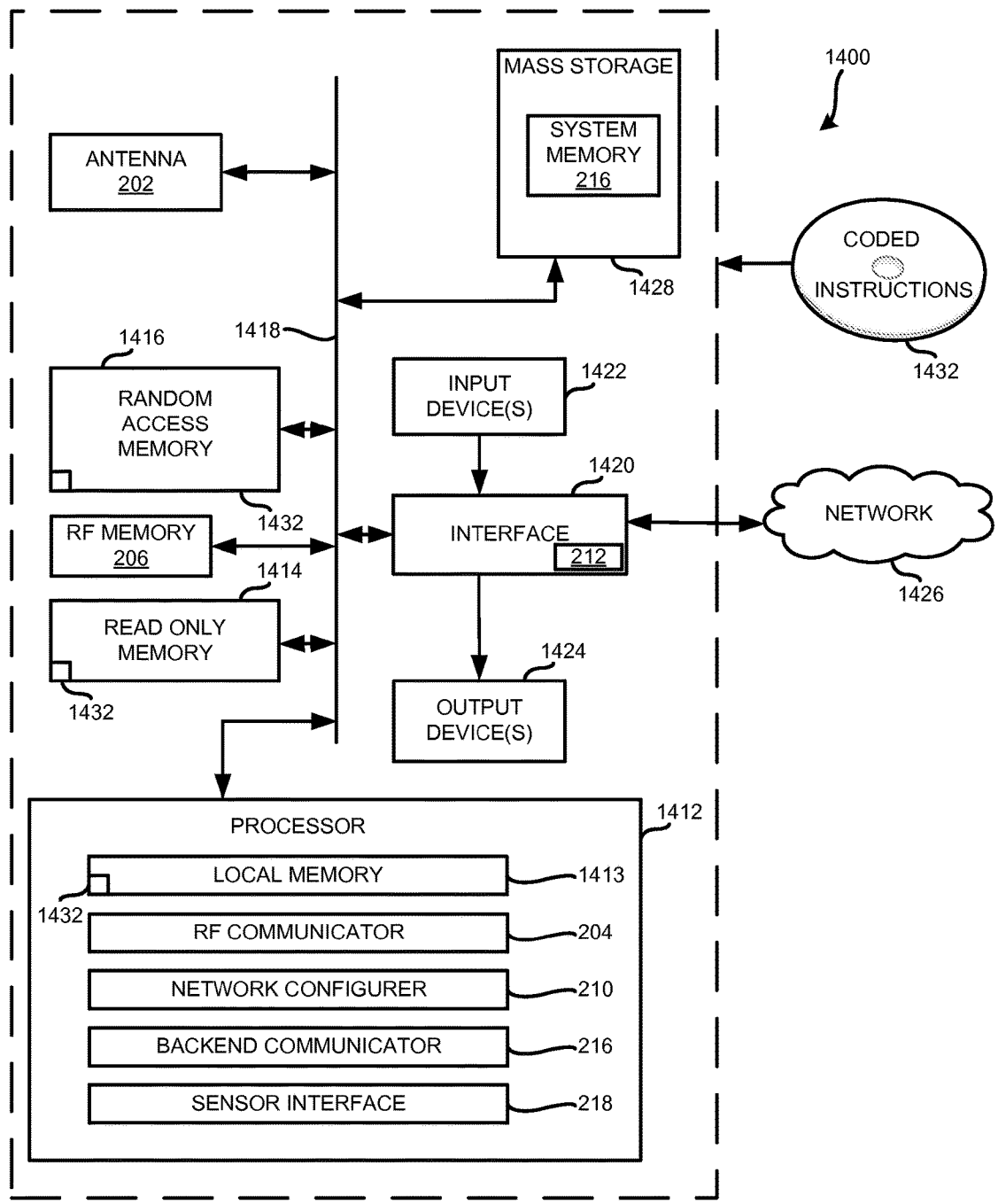
FIG. 14 is a block diagram of an example processor platform capable of executing the instructions of FIGS. 6 and/or 7 to implement the embedded device of FIGS. 1 and/or 2.

FIG. 14 is a block diagram of an example processor platform 1400 capable of executing the instructions of FIGS. 6-7 to implement the example RF communicator 204, the example network configurer 210, the example backend communicator 216, and/or the example sensor interface 218 of FIG. 2. The processor platform 1400 can be, for example, a server, a personal computer, an appliance, a sensor monitor, or any other type of physical device that includes processing circuitry.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. The example processor 1412 of FIG. 14 may implement the example RF communicator 204, the example network configurer 210, the example backend communicator 216, and/or the example sensor interface 218 of FIG. 2.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface. The interface circuit 1420 may implement and/or include the example network interface 212.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The example processor platform 1400 also includes the example antenna 202 for communicating with the example computing device 106 or another device.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives. The example volatile memory 1414 and/or the example mass storage devices 1428 of FIG. 14 may implement the system memory 214 FIG. 2. The processor platform 1400 also includes the example RF memory 206.

The coded instructions 1432 of FIGS. 6-7 may be stored in the mass storage device 1428, in the volatile memory 1414, in the non-volatile memory 1416, and/or on a removable tangible computer readable storage medium such as a CD or DVD.

Figure 15:
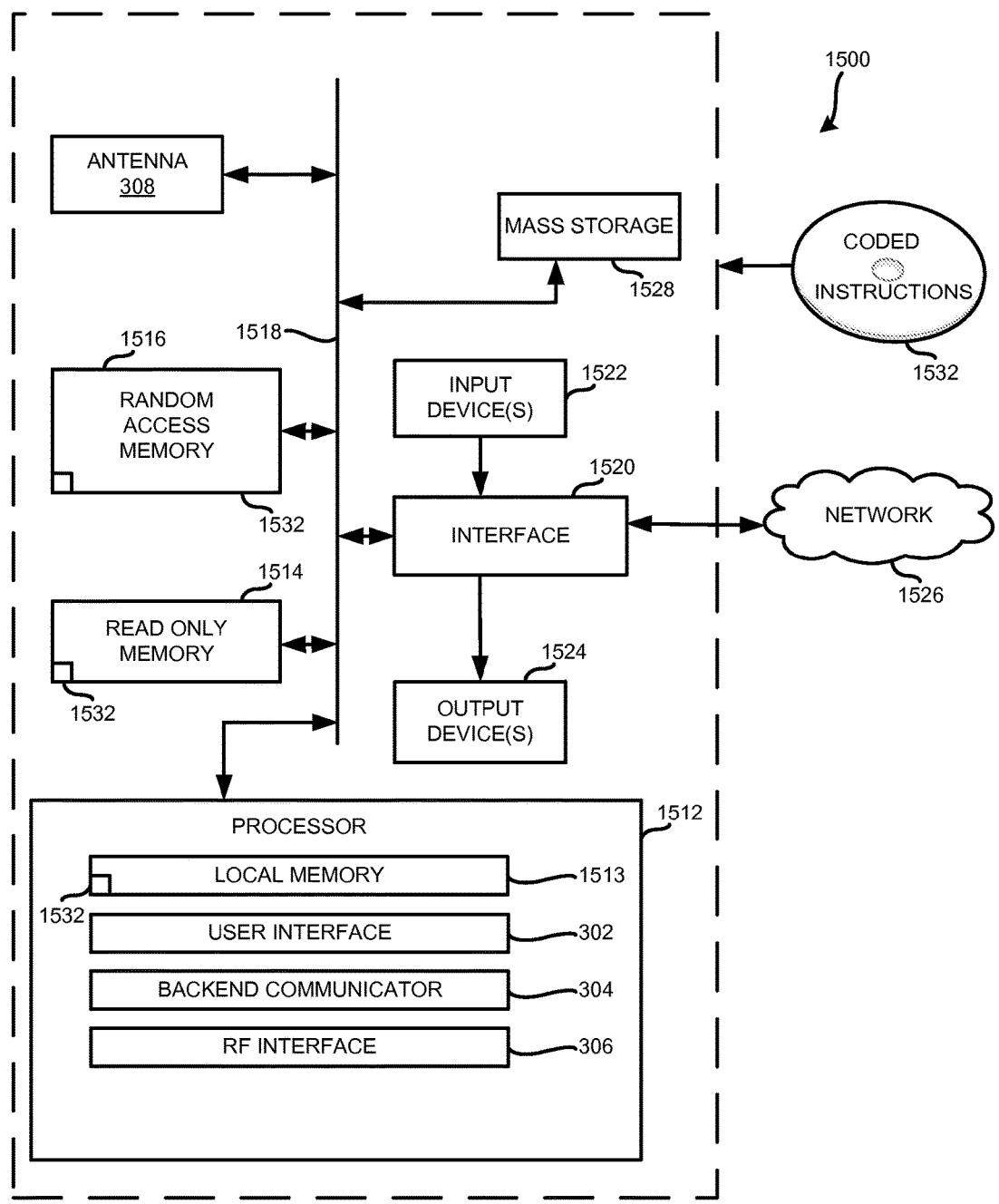
FIG. 15 is a block diagram of an example processor platform capable of executing the instructions of FIG. 8 to implement the computing device of FIGS. 1 and/or 3.

FIG. 15 is a block diagram of an example processor platform 1500 capable of executing the instructions of FIG. 8 to implement the example user interface 302, the example backend communicator 304, and/or the example RF interface 306 of FIG. 3. The processor platform 1500 can be, for example, a server, a personal computer, an appliance, a sensor monitor, or any other type of physical device that includes processing circuitry.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer. The example processor 1512 of FIG. 15 may implement the example user interface 302, the example backend communicator 304, and/or the example RF interface 306 of FIG. 3.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The example processor platform 1500 also includes the example antenna 308 for communicating with the example embedded device 102 or another device.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIG. 8 may be stored in the mass storage device 1528, in the volatile memory 1514, in the non-volatile memory 1516, and/or on a removable tangible computer readable storage medium such as a CD or DVD.

Figure 16:
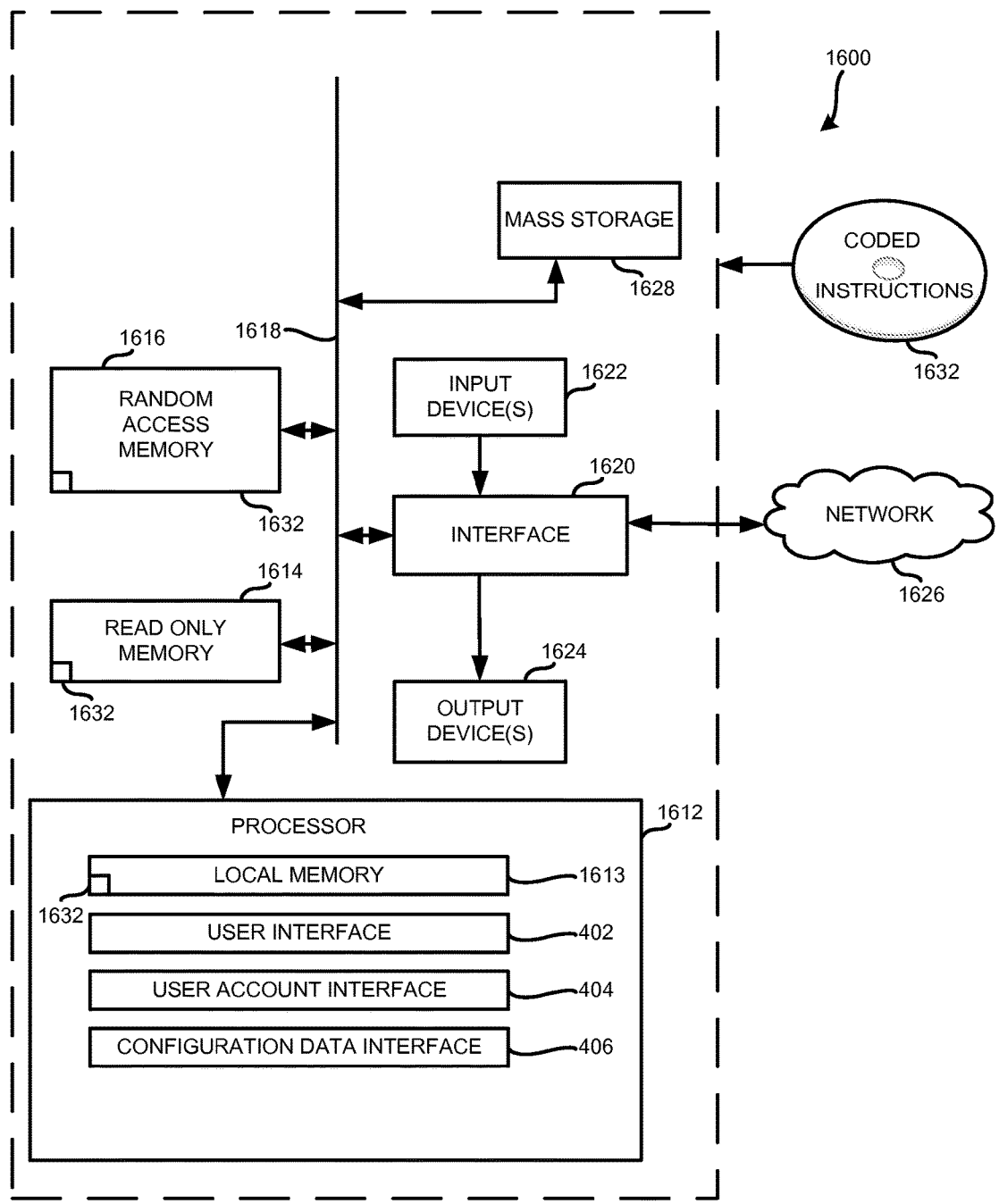
FIG. 16 is a block diagram of an example processor platform capable of executing the instructions of FIGS. 9 and/or 10 to implement the web server of FIGS. 1 and/or 4.

FIG. 16 is a block diagram of an example processor platform 1600 capable of executing the instructions of FIGS. 9-10 to implement the example user interface 402, the example user account interface 404, and/or the example configuration data interface 406 of FIG. 4. The processor platform 1600 can be, for example, a server, a personal computer, an appliance, a sensor monitor, or any other type of physical device that includes processing circuitry.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer. The example processor 1612 of FIG. 16 may implement the example user interface 402, the example user account interface 404, and/or the example configuration data interface 406 of FIG. 4.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIG. 9-10 may be stored in the mass storage device 1628, in the volatile memory 1614, in the non-volatile memory 1616, and/or on a removable tangible computer readable storage medium such as a CD or DVD.

Figure 17:
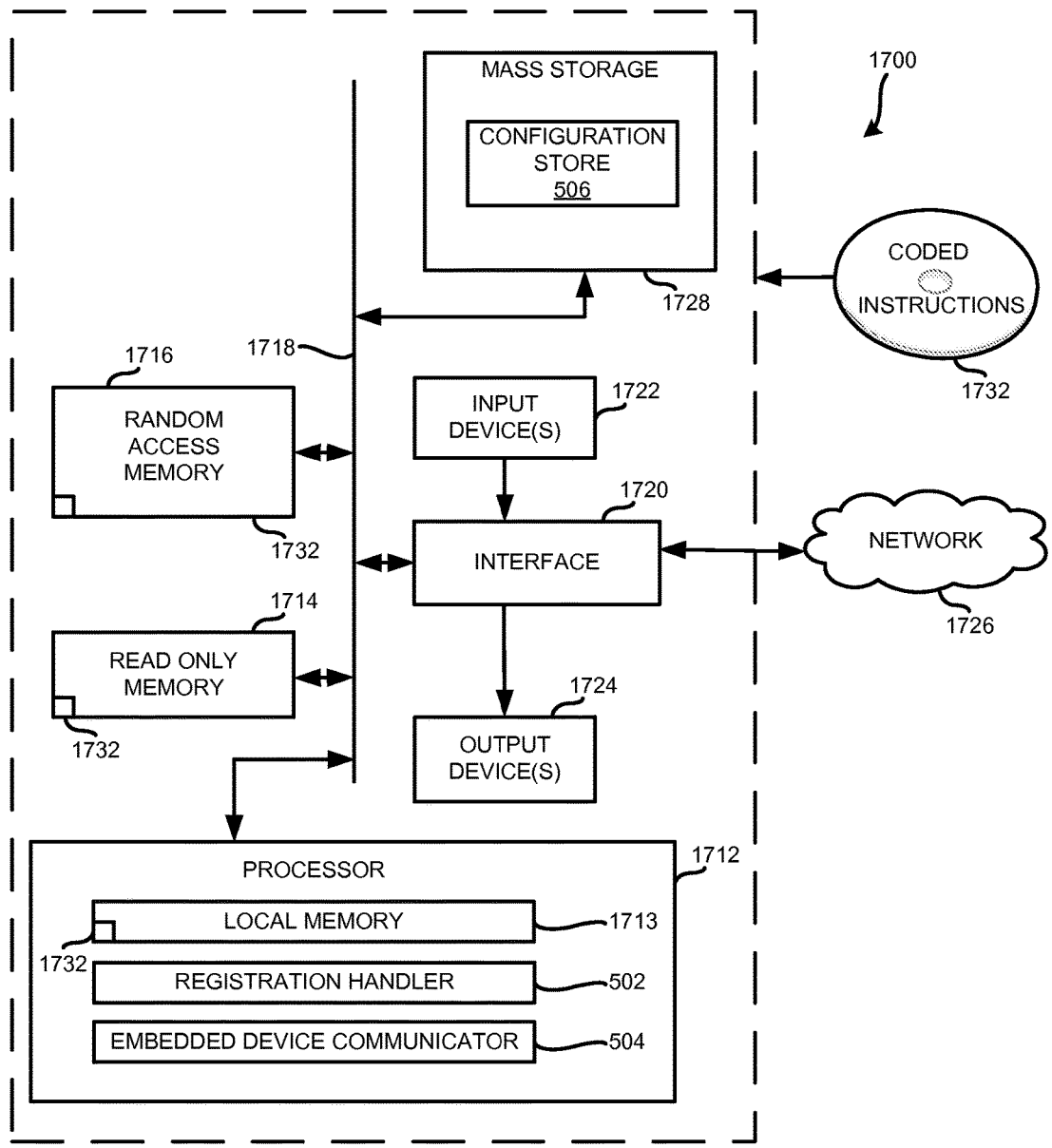
FIG. 17 is a block diagram of an example processor platform capable of executing the instructions of FIGS. 11 and/or 12 to implement the backend server of FIGS. 1 and/or 5.

FIG. 17 is a block diagram of an example processor platform 1700 capable of executing the instructions of FIGS. 11-12 to implement the example registration handler 502 and/or the example embedded device configuration handler 504 of FIG. 5. The processor platform 1700 can be, for example, a server, a personal computer, an appliance, a sensor monitor, or any other type of physical device that includes processing circuitry.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer. The example processor 1712 of FIG. 17 may implement the example registration handler 502 and/or the example embedded device configuration handler 504 of FIG. 5.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives. The example volatile memory 1714 and/or the example mass storage devices 1728 of FIG. 17 may implement the configuration store 506 of FIG. 5.

The coded instructions 1732 of FIGS. 11-12 may be stored in the mass storage device 1728, in the volatile memory 1714, in the non-volatile memory 1716, and/or on a removable tangible computer readable storage medium such as a CD or DVD.

Examples may include subject matter such as a method, means for performing acts of the method, at least one machine-readable medium including instructions that, when performed by a machine cause the machine to performs acts of the method, or of an apparatus or system for configuring embedded devices according to embodiments and examples described herein.

Example 1 is an apparatus that comprises a network interface to communicatively couple the apparatus with a network, an antenna to receive a radio frequency signal including 1) configuration data and 2) power, a memory coupled to the antenna to receive the power and to store the configuration data, a network configurer to retrieve the configuration data from the memory and to configure the network interface based on the retrieved configuration data; and a power source other than the antenna to provide power to the memory and the network configurer during operation of the network configurer.

Example 2 includes the subject matter of Example 1 and further includes a second memory to store a network configuration generated by the network configurer based on the configuration data.

Example 3 includes the subject matter of Example 1 or Example 2 and further includes a backend communicator to communicate with a backend server via the network interface based on the configuration data.

Example 4 includes the subject matter of Example 3, wherein the backend communicator is further to store configuration information received from the backend server in the second memory of the apparatus.

Example 5 includes the subject matter of Example 3 and further includes a radio frequency communicator to communicate, via the antenna, with a computing device different from the apparatus to transmit a device identifier of the apparatus to the computing device, to receive the configuration data, and to store the configuration data in the memory.

Example 6 includes the subject matter of Example 5 and further includes a backend communicator to transmit the device identifier to the backend server for comparison with the device identifier transmitted by the network configurer.

Example 7 includes the subject matter of Example 5, wherein the radio frequency communicator operates according to a short range wireless communication protocol.

Example 8 includes the subject matter of Example 7, wherein the short range wireless communication protocol is near field communication.

Example 9 includes the subject matter of Example 1 or Example 2, wherein the configuration data is encrypted and the network configurer is to decrypt the configuration data prior to configuring the network interface.

Example 10 is a method comprising during a first time period: powering a memory using a radio frequency signal received by an antenna of the embedded device; storing configuration data received by the antenna; and during a second time period, after the first time period: powering the memory using a power source other than the antenna, retrieving the configuration data from the memory, and configuring a network interface of the embedded device based on the configuration data.

Example 11 includes the subject matter of Example 11 and further includes storing a network configuration generated by the network configurer in a second memory of the embedded device.

Example 12 includes the subject-matter of Example 10 or Example 11 and further includes communicating with a backend server via the network interface based on the configuration data.

Example 13 includes the subject-matter of Example 12 and further includes storing configuration information received from the backend server in the second memory of the embedded device.

Example 14 includes the subject-matter of Example 12 and further includes, during the first time period, via the antenna: transmitting a device identifier of the embedded device to a computing device different from the embedded device, receiving the configuration data from the computing device, and storing the configuration data in the memory.

Example 15 includes the subject-matter of Example 14 and further includes, during the second time period, transmitting the device identifier to the backend server for comparison with the device identifier transmitted during the first time period.

Example 16 includes the subject-matter of Example 10 or Example 11, wherein the configuration data is encrypted and further including decrypting the configuration data prior to configuring the network interface.

Example 17 is at least one computer readable storage medium having instructions stored thereon, the instructions when executed on a machine cause the machine to perform the method of any of the aforementioned examples 10-16

Example 18 is an apparatus configured to perform the method of any of the aforementioned examples 10-16. The example 18 may include one or more means for performing the method of any of the aforementioned example 10-16.

Example 19 is a system for configuring embedded devices, the system comprising: a backend server, an embedded device to be configured, and a computing device to wirelessly power a portion of the embedded device and to wirelessly transfer configuration data from the backend server to the embedded device, wherein the embedded device includes a power source that is turned on after the configuration data is received from the computing device and the embedded device is to configure a network interface of the embedded device based on the configuration data.

Example 20 includes the subject-matter of example 19, wherein the embedded devices includes a memory to store a network configuration generated by the embedded device based on the configuration data.

Example 21 includes the subject-matter of example 19 or example 20, wherein the embedded device is to communicate with the backend server via the network interface and is to store configuration information received from the backend server in the memory of the apparatus.

Example 22 includes the subject-matter of example 19, wherein the embedded device is to communicate, via an antenna of the embedded device, with the computing device to transmit a device identifier of the embedded device to the computing device, to receive the configuration data, and to store the configuration data in the memory.

Example 23 includes the subject-matter of Example 22, wherein the embedded device is to transmit the device identifier to the backend server for comparison with the device identifier transmitted to the computing device.

Example 24 includes the subject-matter of Examples 19 to 20, wherein the configuration data is encrypted and the embedded device is to decrypt the configuration data prior to configuring the network interface.

From the foregoing, it will be appreciated that the above disclosed methods, apparatus and articles of manufacture facilitate efficient configuration of an embedded device. In some implementations, embedded devices may be configured by a user without the need for removing the embedded devices from their packaging. For example, a plurality of embedded devices on a pallet could be configured without removing the devices from their pallet or their packaging. In such an example, the time and effort required for configuring the embedded devices is reduced with respect to a system in which the devices must be removed from their packaging, configured, and then repackaged. Furthermore, by utilizing a wirelessly induced power source during an initial stage of configuration, the power requirements (e.g., battery usage) for the embedded device may be reduced because the built-in power source for the embedded device may remain off/unused until the embedded device is powered on.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a network interface to communicatively couple the apparatus with a network;
an antenna to receive a radio frequency signal including 1) configuration data and 2) power;
a memory coupled to the antenna to receive the power and to store the configuration data;
a network configurer to retrieve the configuration data from the memory and to configure the network interface based on the retrieved configuration data;
a power source other than the antenna to provide power to the memory and the network configurer during operation of the network configurer;
a radio frequency communicator to communicate, via the antenna, with a computing device different from the apparatus to transmit a device identifier of the apparatus to the computing device, to receive the configuration data, and to store the configuration data in the memory while powered via the antenna prior to deployment; and
a backend communicator to, after deployment of the apparatus, transmit the device identifier to a backend server via the network for comparison with the device identifier communicated by the radio frequency communicator.

2. An apparatus as defined in claim 1, further including a second memory to store a network configuration generated by the network configurer based on the configuration data.

3. An apparatus as defined in claim 2, wherein the backend communicator is further to store configuration information received from the backend server in the second memory of the apparatus.

4. An apparatus as defined in claim 1, wherein the radio frequency communicator operates according to a short range wireless communication protocol.

5. An apparatus as defined in claim 4, wherein the short range wireless communication protocol is near field communication.

6. An apparatus as defined in claim 1, wherein the configuration data is encrypted and the network configurer is to decrypt the configuration data prior to configuring the network interface.

7. A method for configuring an embedded device, the method comprising:
during a first time period:
powering a memory using a radio frequency signal received by an antenna of the embedded device;
transmitting a device identifier of the embedded device to a computing device different from the embedded device;

storing configuration data received from the computing device by the antenna;

during a second time period, after the first time period:

powering the memory using a power source other than the antenna;

retrieving the configuration data from the memory; and configuring a network interface of the embedded device based on the configuration data for communication on a network; and transmitting the device identifier to a backend server via the network for comparison with the device identifier transmitted during the first time period.

8. A method as defined in claim 7, further storing a network configuration generated by the network configurer in a second memory of the embedded device.

9. A method as defined in claim 8, further including communicating with the backend server via the network interface based on the configuration data.

10. A method as defined in claim 9, further including storing configuration information received from the backend server in the second memory of the embedded device.

11. A method as defined in claim 7, wherein the configuration data is encrypted and further including decrypting the configuration data prior to configuring the network interface.

12. A method as defined in claim 7, further comprising, in response to transmitting the device identifier to the backend server via the network, receiving, via the network, a signed certificate for use by the embedded device.

13. A method as defined in claim 7, wherein transmitting the device identifier includes:

generating a certificate signing request including the device identifier; and transmitting the certificate signing request to the backend server.

14. A tangible computer readable storage medium comprising instructions that, when executed, cause a machine to:

during a first time period:

power a memory using a radio frequency signal received by an antenna of an embedded device;

transmit a device identifier of the embedded device to a computing device different from the embedded device;

store configuration data received from the computing device by the antenna;

during a second time period, after the first time period:

power the memory using a power source other than the antenna;

retrieve the configuration data from the memory;

configure a network interface of the embedded device based on the configuration data for communication on a network; and transmit the device identifier to a backend server via the network for comparison with the device identifier transmitted during the first time period.

15. A tangible computer readable storage medium as defined in claim 14, wherein the instructions, when executed, cause the machine to store a network configuration generated by the network configurer in a second memory of the embedded device.

16. A tangible computer readable storage medium as defined in claim 15, wherein the instructions, when executed, cause the machine to communicate with the backend server via the network interface based on the configuration data.

17. A tangible computer readable storage medium as defined in claim 16, wherein the instructions, when executed, cause the machine to store configuration information received from the backend server in the second memory of the embedded device.

18. A tangible computer readable storage medium as defined in claim 14, wherein the configuration data is encrypted and wherein the instructions, when executed, cause the machine to decrypt the configuration data prior to configuring the network interface.

\* \* \* \* \*